United States Patent
Boon et al.

(10) Patent No.: US 6,574,368 B1
(45) Date of Patent: Jun. 3, 2003

(54) IMAGE PROCESSING METHOD, IMAGE PROCESSING APPARATUS AND DATA STORAGE MEDIA

(75) Inventors: Choong Seng Boon, Osaka (JP); Takahiro Nishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/547,883

(22) Filed: Apr. 12, 2000

(30) Foreign Application Priority Data

Apr. 12, 1999  (JP) .......................................... 11-104507

(51) Int. Cl.⁷ ................................................. G06K 9/36
(52) U.S. Cl. ...................................................... 382/232
(58) Field of Search ................................. 382/232, 233, 382/236, 238, 239, 240, 248, 250, 251, 253; 348/384.1, 394.1–395.1, 400.1–404.1, 407.1–416.1, 420.1, 421.1, 425.2, 430.1, 431.1; 375/240.01, 240.02, 240.03, 240.08, 240.12, 240.18, 240.2, 240.22, 240.24

(56) References Cited

U.S. PATENT DOCUMENTS

| | | | | |
|---|---|---|---|---|
| 5,079,621 A | * | 1/1992 | Daly et al. ................ 348/396.1 |
| 5,231,484 A | * | 7/1993 | Gonzales et al. ......... 375/240.04 |
| 5,598,213 A | * | 1/1997 | Chung et al. ............ 375/240.04 |
| 5,990,957 A | | 11/1999 | Ryoo .......................... 348/405 |
| 6,351,565 B1 | * | 2/2002 | Boon ........................... 382/236 |
| 6,259,733 B1 | * | 7/2002 | Kaye et al. ............. 375/240.03 |
| 6,430,222 B1 | * | 8/2002 | Okada ..................... 375/240.03 |
| 6,490,319 B1 | * | 12/2002 | Yang ....................... 375/240.03 |

FOREIGN PATENT DOCUMENTS

| | | |
|---|---|---|
| JP | 10-257489 | 9/1998 |
| JP | 10-304353 | 11/1998 |
| KR | 1998-034879 | 8/1998 |

OTHER PUBLICATIONS

International Organisation for Standardisation Organisation Internationale De Normalisation ISO/IEC JTC1/SC29/WG11 Coding of Moving Pictures and Associated Audio Information;MPEG–4 Video Verification Model Version 8.0 Stockholm; Jul. 1997.

* cited by examiner

Primary Examiner—Jose L. Couso
(74) Attorney, Agent, or Firm—Wenderoth, Lind & Ponack, L.L.P.

(57) ABSTRACT

The present invention provides an image processing apparatus which can perform a coding processing for object image data of each constituent on optimal conditions, thereby increasing the quality of a whole reproduced image of a video signal reproduced. The image processing apparatus comprises a decision unit 210 for deciding the number of bits per frame which are allocated to a video signal corresponding to a target frame as a target of the coding processing and an a decision unit 209 for allocating the number of bits per frame to each constituent according to complexity of each of constituents of the target frame, and codes each of the object image data corresponding to the target frame on the basis of the number of bits distributed to each constituent.

24 Claims, 17 Drawing Sheets

IMAGE PROCESSING METHOD, IMAGE PROCESSING APPARATUS AND DATA STORAGE MEDIA

FIELD OF THE INVENTION

The present invention relates to image processing methods, image processing apparatus, and data storage media and, more particularly, to control of the number of bits generated in a coding process of coding video signals which comprise object image data corresponding to a sequence of plural objects (i.e., plural constituents of an image).

BACKGROUND OF THE INVENTION

In order to store or transmit digital image information efficiently, the digital image information should be compressively coded. At present, as methods for compressively coding the digital image information, there are Discrete Cosine Transform such as JPEG (Joint Photographic Coding Experts Group) and MPEG (Moving Picture Experts Group), and waveform coding methods such as sub-band coding, wavelet coding and fractal coding.

In addition, as an method for removing redundant image information between screens such as adjacent frames, there is a method which performs inter-frame prediction using motion compensation, i.e., represents pixel values of pixels constituting the present frame by using differential values between those pixel values and pixel values of pixels constituting its previous frame, and subjects differential image signals comprising the differential values to the waveform coding.

In recent years, in order to improve compression efficiency for video signals and at the same time reproduce the video signals in units of individual objects (constituents) constituting a prescribed image, a coding method which compressively codes object image data corresponding to the objects independently, object by object, and transmits the data is contrived. The video signals which are coded according to this coding method are subjected to a decoding processing corresponding to this coding method at the reproduction end. To be specific, in this decoding process, object coded data corresponding to each object is decoded and then respective object decoded data corresponding to the objects which are obtained by the decoding process are composed, whereby reproduced data is generated. Accordingly, an image comprising the individual objects is displayed on the basis of the reproduced data.

When the coding method which codes video signals in object units is utilized, composed images can be generated by combining the individual objects freely at the reproduction end, whereby moving pictures can be easily reedited. Further, moving pictures comprising only more significant objects can be displayed according to busyness of channels, performance of a reproduction apparatus or tastes of viewers, without reproducing relatively less significant objects.

This coding method which codes video signals in object units is called "object coding method" and this method is internationally standardized as MPEG4.

As for coded data which are obtained by compressing video signals according to the coding process as described above, an amount of codes to be decoded (the number of bits to be processed) for each prescribed time is changed. Accordingly, in order to transmit this coded data to the receiving end at a fixed bit rate and reproduce the coded data satisfactorily at the receiving end, a buffer for containing coded data should be provided at the receiving end to absorb changes in the number of bits to be processed for each prescribed time. In this case, a range of changes in the number of bits to be processed, which can be absorbed by the buffer varies according to the size of the buffer, i.e., the maximum amount of data which can be stored in the buffer.

In the standards, the maximum value of the buffer size is decided. In a receiver having a buffer of this maximum size, coded data whose number of bits to be processed per time varies are received at the fixed bit rate and reproduced without problems.

At this time at the coding end, a transmission rate is controlled at a uniform bit rate on the basis of functional restrictions, such as the size, on the buffer of the receiving end, so that the buffer does not brim over (overflow) or is not emptied (underflow).

In the object coding method, one video signal comprises object image data corresponding to plural constituents. As examples of these constituents, there are rectangular shaped images and arbitrary shaped images (objects). For example, the arbitrary shaped images, such as images of animation characters, figures and animals can be combined with the rectangular shaped image for the background.

In conventional image transmission systems, an image decoding apparatus at the receiving end includes a buffer for absorbing changes in the number of bits to be processed for each unit time as described above, corresponding to each constituent.

To be specific, at the receiving end, object coded data corresponding to one constituent is decoded by a buffer and a decoder for this constituent. Then, when video signals are coded at the transmission end, the rate control, i.e., control of the amount of codes generated as coded data is executed so that the buffer for each constituent does not overflow or underflow. In other words, the rate control in the coding process is executed independently for each constituent.

FIG. 13 is a block diagram illustrating structures of a coding apparatus and a decoding apparatus, which constitute a prior art image transmission system. Here, for convenience' sake, a case where three constituents are processed is described. However, the number of constituents is not limited to three.

This image transmission system 1000 includes a coding apparatus 1000a for receiving image data (object image data) 1304, 1314 and 1324 which correspond to first, second and third objects (constituents), subjecting these data to compressive coding and multiplexing, and outputting a multiple bitstream 1308, and a decoding apparatus 1000b for receiving the multiple bitstream 1308, subjecting compressed data (object coded data) corresponding to the respective objects to decompressive decoding and composition, and generating reproduced data corresponding to an image which comprises the respective objects.

The coding apparatus 1000a includes first, second and third encoders 1302, 1312 and 1322 for coding the image data 1304, 1314 and 1324 which correspond to the first, second and third objects (constituents), and outputting compressed data 1305, 1315 and 1325, and a multiplexer 1307 for multiplexing the compressed data 1305, 1315 and 1325 corresponding to the respective objects, and outputting the multiple bitstream 1308. The coding apparatus 1000a further includes rate controllers 1303, 1313 and 1323 which are provided for the respective encoders 1304, 1314 and 1324 and which control amounts of data (the numbers of bits) to be decoded for each prescribed time, of the compressed data 1305, 1315 and 1325 generated by the respective encoders, on the basis of the compressed data output by the respective encoders.

The decoding apparatus 1000b includes a separator 1318 for receiving the multiple bitstream 1308 as input data 1317, and extracting compressed data 1330, 1335 and 1340 corresponding to the respective objects from the input data 1317, and first, second and third buffers 1331, 1336 and 1341 which are provided for the respective objects and contain the compressed data 1330, 1335 and 1340, respectively. The decoding apparatus 1000b further includes first, second and third decoders 1333, 1338 and 1343 which are provided for the respective objects and read compressed data 1332, 1337 and 1342 stored in the respective buffers and subjecting the read data to decoding, and a composer 1319 for composing decoded data 1334, 1339 and 1344 which are output by the respective decoders, and outputting reproduced data 1320 corresponding to a prescribed image.

In FIG. 13, the first, second and third image data are input to input terminals 1301, 1311 and 1321 of the coding apparatus 1000a, respectively. The multiple bitstream 1308 is output from an output terminal 1309 of the coding apparatus 1000a. The multiple bitstream 1308 is input to an input terminal 1310 of the decoding apparatus 1000b. The reproduced data 1320 is output from an output terminal 1327 of the decoding apparatus 1000b.

In this image transmission system, the rate controllers 1303, 1313 and 1323 execute the rate control independently for the respective encoders 1302, 1312 and 1322 so that the buffers 1331, 1336 and 1341 at the receiving end do not overflow or underflow.

Next, the operation will be described.

In the image transmission system 1000, when the image data 1304, 1314 and 1324 corresponding to the respective objects are input to the respective input terminals 1301, 1311 and 1321, for example in the first encoder 1320, a coding process for the image data 1304 corresponding to the first object is performed in accordance with a control signal 1306 from the corresponding rate controller 1303. Also in the second and third encoders 1312 and 1322, coding processes for the image data 1314 and 1324 are similarly performed in accordance with control signals 1316 and 1326.

The compressed data 1305, 1315 and 1325 which are obtained in the coding processes by the respective encoders are multiplexed by the multiplexer 1307, and output from the output terminal 1309 as the multiple bitstream 1308.

On the other hand, in the decoding apparatus 1000b at the receiving end, when the multiple bitstream 1308 is input, the compressed data 1330, 1335 and 1340 corresponding to the respective objects are separated from the multiple bitstream 1308 by the separator 1318, and input to the corresponding buffers 1331, 1336 and 1341, respectively. The compressed data stored in the respective buffers are read by the corresponding decoders 1333, 1338 and 1343 and subjected to the decoding processes, respectively, whereby the decoded data 1334, 1339 and 1344 are generated. These decoded data 1334, 1339 and 1344 are composed by the composer 1319, and composed data is output as the reproduced data 1320 corresponding to a prescribed image.

When the coded data is transmitted from the coding apparatus to the decoding apparatus as described above, in each of the rate controllers 1303, 1313 and 1323 in the coding apparatus at the transmission end, the rate control in the coding process is executed independently for each encoder corresponding to each object, so that the buffers 1331, 1336 and 1341 at the receiving end do not overflow or underflow.

As described above, in the prior art image transmission system 1000, the respective decoders 1333, 1338 and 1343 read the compressed data from the independent buffers 1331, 1336 and 1341 and decode the data, respectively, as shown in FIG. 13. In addition, the maximum values of the sizes of the respective buffers are fixed and, in most cases, the maximum values are the same value.

In this case, at the coding end, it is possible that a value which is smaller than the maximum value of the buffer size is set as a threshold of the buffer size and the coding process is performed according to the threshold. This coding method is often used when image coded data having a smaller code amount is transmitted.

However, when the coding is performed for image data of constituents requiring large code amounts at the transmission end with executing the rate control using a larger value than the maximum value of the buffer size as the threshold, normal decoding cannot be performed by the decoders at the receiving end. In this case, in order to perform the normal decoding at the receiving end, the image data of the constituents requiring larger code amounts should be coded at a further higher compression rate. When the coding is performed at this higher compression rate, the quality of a reproduced image is deteriorated.

FIGS. 14(a)–14(c) are diagrams schematically showing by graphs transitions of occupied amounts of buffers for decoders (amounts of occupation of buffer capacities by compressed data). FIG. 14(a) shows the occupied amount of the buffer for a decoder for the first constituent. FIGS. 14(b) and 14(c) show the occupied amounts of the buffers for decoders for the second and third constituents, respectively. In the figures, the vertical axes 1401, 1411 and 1421 show the occupied amounts of the buffers for decoders, and the horizontal axes 1402, 1412 and 1422 show the display times "t" for the compressed data. The display times t0, t1, t2, t3, . . . show, for example, times when n-th, (n+1)-th, (n+2)-th, (n+3)-th, . . . frames are displayed.

The inclination of an inclined part 1404 of the graph in FIG. 14(a) shows the amount of codes which are input for each unit time (input bit rate) of the compressed data corresponding to the first object which is input to the buffer. In FIG. 14(a), this input bit rate is fixed. In the figure, Dm1 shows the maximum value of the compressed data which can be stored in the buffer. In any case, the buffer cannot contain the compressed data more than this maximum value.

In addition, the length of a vertical line part 1405 which is vertical to the horizontal axis in the graph shows the number of bits of the compressed data of the first object corresponding to a frame which is displayed at time t0. To be specific, bit strings are input to the buffer at the input bit rate shown by the inclination of the inclined part 1404 in the graph, and the amount of data stored in the buffer reaches a level corresponding to the peak of the vertical line part 1405 at time t0. At this time, the decoder reads the compressed data of the number of bits which is shown by the length of the vertical line part 1405, and decodes the compressed data corresponding to the frame of the time t0.

The inclinations of inclined parts 1414 and 1424 of graphs in FIGS. 14(b) and 14(c) show the amounts of codes which are input for each unit time (input bit rates) of compressed data corresponding to the second and third objects which are input to the buffers. In FIGS. 14(b) and 14(c), the input bit rates are fixed. In the figures, Dm2 and Dm3 show the maximum values of data which can be stored in the buffers 1336 and 1341, respectively. In any case, the buffers cannot contain data more than the maximum values.

The lengths of vertical line parts 1415 and 1425 which are vertical to the horizontal axes in the graphs show the numbers of bits of the compressed data of the second and third objects corresponding to frames which are displayed at time t0. To be specific, bit strings are input to the buffers at the input bit rates shown by the inclinations of the inclined parts 1414 and 1424 in the graphs, and the amounts of data stored in the buffers reach levels corresponding to peaks of the vertical line parts 1415 and 1425 at time t0. At this time, the decoders read the compressed data of the numbers of bits which are shown by the lengths of the vertical line parts 1415 and 1425, and decodes the compressed data corresponding to the frames of time t0.

Here, assume that the first constituent (object) is a constituent which requires a large amount of codes in the coding process and the second constituent (object) is a constituent which requires a small amount of codes in the coding process. The buffer for the first constituent (FIG. 14(*a*)) is occupied by the compressed data up to approximately the maximum value of the data storage amount. On the other hand, the buffer for the second constituent (FIG. 14(*b*)) has still a considerable margin in the data storage amount.

In this case, in the prior art image transmission system, a data storage area in the buffer having a small amount of stored data cannot be allocated to the compressed data for the first constituent. Accordingly, the image data for the first constituent should be compressed at a higher compression rate than that of the second constituent, whereby the quality of the image of the first constituent is deteriorated.

Further, as for the third constituent (FIG. 14(*c*)), compressed data which are read at times t0 and t1 have small code amounts and compressed data which is read at time t2 has a large code amount. In a buffer corresponding to a constituent, the complexities of its images being largely changed with a lapse of time, its data storage area is almost all occupied. As for this constituent, the allocation of the code amount to the compressed data is restricted in a frame in which the compressed data is read at time t2 by the restriction on the buffer size, whereby the quality of the image for this frame is deteriorated accordingly.

In addition, in some cases, even when the complexities of all constituents or changes in the complexities are the same on the average, an image of a specific constituent is locally more complex than images of other constituents at a certain time. In these cases, even when a larger number of bits are to be allocated to data corresponding to the specific constituent to code the data, the number of bits can be allocated only up to the maximum limit of the data storage amount of the corresponding buffer for the specific constituent due to the restriction of the buffer size, even when there are margins in the amounts of occupation of buffers by data corresponding to other constituents. Accordingly, when the image of the specific constituent is complex, the quality of the image cannot be improved.

As described above, in the prior art, the buffer for containing coded data (compressed data) is provided independently for each constituent (i.e., each decoder) at the receiving end. Therefore, the buffers cannot be effectively utilized among the constituents, whereby the quality of an image of a specific constituent is deteriorated and the quality of a composed image becomes uneven.

Further, transmission rates of compressed data for the respective objects are previously set in consideration of the complexities of images of the objects. Therefore, the transmission rates are not always suitable for actual communication lines having limited data transmission speeds.

SUMMARY OF THE INVENTION

It is an object of the present invention to provide an image processing method and image processing apparatus, which can utilize buffers for containing coded data effectively among plural different constituents, and kinetically distribute the number of bits according to the complexities of the respective constituents unless the buffers do not overflow or underflow, and a data storage medium which contains a program for executing the image processing according to the image processing method by a computer.

It is an object of the present invention to provide an image processing method and image processing apparatus, which can adapt transmission rates of compressed data corresponding to objects to actual communication lines having limited data transmission speeds, and a data storage medium which contains a program for executing the image processing according to the image processing method by a computer.

Other objects and advantages of the present invention will become apparent from the detailed description and specific embodiments described are provided only for illustration since various additions and modifications within the spirit and scope of the invention will be apparent to those of skill in the art from the detailed description.

An image processing method according to a 1st aspect of the present invention, of subjecting a video signal for displaying a prescribed image, to an object coding processing of coding object image data for plural constituents of the prescribed image separately for each constituent, to convert the object image data into object coded data, comprises: a complexity measurement step of measuring complexity of each constituent, corresponding to a number of bits required for the coding processing for each of the object image data; and a number-of-bits-allocation-ratio decision step of deciding a ratio of a number of bits which are allocated to each of the object image data among the plural constituents, according to the complexity of each constituent, and each of the object image data is coded so that a number of bits for each of the object coded data meets the decided ratio of the number of bits allocated among the constituents.

According to a 2nd aspect of the present invention, an image processing method of decoding multiplex coded data obtained by multiplexing object coded data for constituents, which are obtained according to the image processing method of the 1st aspect, comprises: a separation step of separating the object coded data for each of the constituents from the multiplex coded data; a storage step of storing the object coded data for each of the constituents in a buffer; and a decoding step of extracting the object coded data for each constituent from the buffer and decoding the extracted object coded data.

According to a 3rd aspect of the present invention, in the image processing method of the 1st aspect, an index indicating the complexity of each of the constituents is one of a first value which indicates a variance of pixel values of pixels constituting each of the constituents, a second value which indicates a magnitude of a temporal change of a display image of each of the constituents, a third value which is obtained by weighting a number of bits generated in coding a corresponding constituent in a previously processed frame which was subjected to the coding processing before a target frame as a target of the coding processing, by a ratio of a coefficient indicating characteristics of the constituent between the target frame and the previously processed frame, and a fourth value which indicates a number of generated bits for each of the constituent, which are generated in preliminarily coding the object image data for each of the constituents under prescribed coding conditions.

An image processing method according to a 4th aspect of the present invention, of subjecting a video signal for displaying a prescribed image, to an object coding processing of coding object image data for plural constituents of the prescribed image separately for each constituent, to convert the object image data into object coded data, frame by frame as a unit of a display process, comprises: a number-of-bits-per-frame decision step of deciding a number of bits per frame, which are allocated to a video signal corresponding to a target frame as a target of the coding processing; and a number-of-bits distribution step of distributing the number of bits per frame so as to correspond to each of constituents of the target frame, according to complexity of each of the constituents, to decide a number of bits per object for each of the constituents corresponding to the target frame, and each of the object image data corresponding to the target frame is coded so that a number of bits of corresponding object coded data is equal to the number of bits per object of each of the constituents corresponding to the target frame.

An image processing method according to a 5th aspect of the present invention, of subjecting a video signal for displaying a prescribed image, to an object coding processing of coding object image data for plural constituents of the prescribed image separately for each constituent, to convert the object image data into object coded data, frame by frame as a unit of a display process, comprises: a number-of-bits-per-frame decision step of deciding a number of bits per frame, which are allocated to a video signal corresponding to a target frame as a target of the coding processing; and a number-of-bits-allocation-ratio decision step of deciding a ratio of a number of bits which are allocated to each of the object image data among plural constituents of the target frame, according to a ratio of complexity of each of the constituents to a sum of complexities of the plural constituents, and each of the object image data is coded so that the number of bits per frame is distributed to each of the object coded data according to the decided ratio of the number of bits which are allocated among the plural constituents.

An image processing apparatus according to a 6th aspect of the present invention, which subjects a video signal for displaying a prescribed image, to an object coding processing of coding object image data for plural constituents of the prescribed image separately for each constituent, to convert the object image data into object coded data, comprises: a complexity measurement unit for measuring complexity of each of the constituents, which corresponds to a number of bits required for the coding processing for each of the object image data; a number-of-bits allocation unit for allocating a number of bits which are used in coding object image data, to each of constituents of a target frame as a target of the coding processing, according to the complexity of each of the constituents; an encoder for coding each of object image data corresponding to the target frame, on the basis of the number of bits allocated to each of the constituents, to generate the object coded data; and a multiplexer for multiplexing the object coded data for the constituents, to generates a bitstream.

According to a 7th aspect of the present invention, in the image processing apparatus of the 6th aspect, the number-of-bits allocation unit allocates the number of bits to each of the constituents on the basis of a ratio of the complexity of each of the constituents to a sum of the complexities of all the constituents of the target frame.

According to an 8th aspect of the present invention, in the image processing apparatus of the 6th aspect, the complexity measurement unit measures the complexity of each of the constituents using as an index, one of a first value which indicates a variance of pixel values of pixels constituting each of the constituents, a second value which indicates a magnitude of a temporal change of a display image of each of the constituents, a third value which is obtained by weighting a number of bits generated in coding a corresponding constituent in a previously coded frame which was subjected to the coding processing before the target frame, by a ratio of a coefficient indicating characteristics of the constituent between the target frame and the previously processed frame, and a fourth value which indicates a number of generated bits for each of the constituent, which are generated in preliminarily coding the object image data for each of the constituents under prescribed coding conditions.

According to a 9th aspect of the present invention, in the image processing apparatus of the 6th aspect, the number-of-bits allocation unit distributes a number of bits per frame, which are allocated to a video signal of the target frame, to each of the constituents, so that a buffer for containing the object coded data corresponding to each of the constituents, which data is separated from the bitstream in an image decoding apparatus which subjects the bitstream to a decoding processing does not overflow or underflow.

According to a 10th aspect of the present invention, there is provided a data storage medium which contains an image processing program in which the image processing program is a program for executing the coding processing for video signals according to the image processing method of the 1st aspect, by a computer.

According to an 11th aspect of the present invention, there is provided an image processing method which includes a data processing at transmission end for converting a video signal for displaying a prescribed image into a bitstream, frame by frame, according to a coding processing, and transmitting the bitstream, and a data processing at receiving end for receiving the bitstream, and converting the bitstream into reproduced data, frame by frame, according to a decoding processing, in which the data processing at transmission end comprises: an object coding step of coding object image data of a target frame as a target of the coding processing, corresponding to plural constituents of the prescribed image separately for each constituent, to convert the object image data into object coded data; and a multiplexing step of multiplexing the object coded data corresponding to the constituents, to generate the bitstream, and the data processing at receiving end comprises steps of: a data storage step of storing the bitstream in one buffer, frame by frame; a decoding step of reading a bitstream corresponding to the target frame from the buffer and decoding the read bitstream separately for each constituent, to generate reproduced data corresponding to each of the constituents; and a composition and display step of composing the reproduced data corresponding to the constituents to generate composed data, and displaying the prescribed image on the basis of the composed data.

According to a 12 aspect of the present invention, in the image processing method of the 11th aspect, the object coding step comprises: a number-of-bits decision step of deciding a number of bits per frame, which are allocated to the target frame as a target of the coding, so that the buffer does not underflow or overflow; and a number-of-bits distribution step of distributing the number of bit per frame so as to correspond to each of constituents of the target frame according to complexity of each of the constituents, to decide a number of bits per object for each of the constituents, and the object image data for each of the constituents of the target frame is coded on the basis of each of the number of bits per object.

According to the 1st to 12th aspects of the present invention, the coding processing for the image data of each of the constituents can be performed on optimal conditions, whereby the quality of a whole reproduced image of a video signal can be increased.

Especially according to the 3rd or 4th aspect of the present invention, the decoding processing at the receiving end can always be performed satisfactorily.

An image processing apparatus according to a 13th aspect of the present invention, which decodes multiplex coded data which is obtained by subjecting a video signal for displaying a prescribed image to an object coding processing of coding object image data for plural constituents of the prescribed image separately for each constituent to convert the object image data into object coded data, and multiplexing the object coded data, comprises: a separator for separating the object coded data corresponding to each of the constituents from the multiplex coded data; a buffer for containing the object coded data corresponding to each of the constituents; and a decoder for extracting the object coded data corresponding to each of the constituents from the buffer and decoding the object coded data. Therefore, the data storage area of the buffer can be commonly used effectively among the plural constituents. That is, the change in the number of bits allocated to each constituent according to the complexity of the constituent can be absorbed among the plural constituents. Consequently, an optimal number of bits can be allocated to the image of each constituent, whereby the quality of the whole image can be increase.

An image processing method according to a 14th aspect of the present invention, for subjecting a video signal for displaying a prescribed image, to an object coding processing of coding object image data for plural constituents of the prescribed image separately for each constituent, to convert the object image data into object coded data, frame by frame as a unit of a display process, comprises: a complexity obtaining step of obtaining a number of generated bits for each of the constituents, which bits are obtained by preliminarily coding the object image data corresponding to each of the constituents, as an index of complexity of each of the constituents; a distribution-ratio-per-frame obtaining step of obtaining a ratio of the complexity of a target frame as a target of a main coding processing, to a sum of the complexities of all frames which are not subjected to the main coding processing yet, as a distribution ratio per frame; a number-of-bits-per-frame decision step of multiplying a number of bits which are not used yet among a total number of bits which are allocated to the video signal, by the distribution ratio per frame, to decide a number of bits which are allocated to the target frame; a distribution ratio obtaining step of obtaining a ratio of complexity of each of constituents of the target frame as a target constituent of the main coding processing to a sum of complexities of all the constituents, as a distribution ratio per constituent; a number-of-bits-per-constituent decision step of multiplying the number of bits which are allocated to the target frame, by the distribution ratio per constituent, to decide a number of bits which are allocated to the target constituent; and a constituent coding step of coding the object image data corresponding to each of the constituents of the target frame separately on the basis of the number of bits allocated to each of the constituents.

An image processing apparatus according to a 15th aspect of the present invention, which subjects a video signal for displaying a prescribed image, to an object image processing of coding object image data for plural constituents of the prescribed image separately for each constituent, to convert the object image data into object coded data, comprises: a complexity measurement unit for obtaining a number of generated bits for each of the constituents, which bits are generated by preliminary coding the object image data corresponding to each of the constituents, as an index of complexity of each of the constituents; a distribution-ratio-per-frame obtaining unit for obtaining a ratio of the complexity of a target frame as a target of a main coding processing, to a sum of the complexities of all frames which are not subjected to the main coding processing yet, as a distribution ratio per frame; a number-of-bits-per-frame decision unit for multiplying a number of bits which are not used yet among a total number of bits which are allocated to the video signal, by the distribution ratio per frame, to decide the number of bits which are allocated to the target frame; a distribution ratio obtaining unit for obtaining a ratio of complexity of each of constituents of the target frame as a target constituent of the main coding processing to a sum of complexities of all the constituents, as a distribution ratio per constituent; a number-of-bits-per-constituent decision unit for multiplying the number of bits which are allocated to the target frame, by the distribution ratio per constituent, to decide a number of bits which are allocated to the target constituent; a coding unit for coding each of the constituents of the target frame separately on the basis of the number of bits allocated to each of the constituents, to generate the object coded data; and a multiplexer for multiplexing the object coded data corresponding to the plural constituents, and outputting a bitstream.

According to a 16th aspect of the present invention, there is provided a data storage medium which contains an image processing program, in which the image processing program is a program for executing the coding processing of video signals according to the image processing method of the 14th aspect, by a computer.

According to a 17th aspect of the present invention, there is provided an image processing method of subjecting a video signal for displaying a prescribed image, to an object coding processing of coding object image data for plural constituents of the prescribed image separately for each constituent, to convert the object image data into object coded data, in which the object coding processing comprises: a complexity measurement step of measuring complexity of each of the constituents, which corresponds to a number of bits required for the coding processing for each of the object image data; and a rate ratio decision step of deciding a ratio of a bit rate of the object coded data for each of the constituents among the plural constituents, according to the complexity of each of the constituents, and the object image data for each of the constituents is coded at a prescribed bit rate on the basis of the ratio of the bit rate for each of the constituents, so that a sum of the bit rates for all the constituents has a fixed value.

An image processing method according to an 18th aspect of the present invention, of decoding multiplex coded data obtained by multiplexing the object coded data for the constituents, which are obtained according to the image processing method of the 17th aspect comprises: a separation step of separating the object coded data for each of the constituents from the multiplex coded data; a storage step of storing the object coded data for each of the constituents in one buffer; and a decoding step of extracting the object coded data for each of the constituents from the buffer, and decoding the object coded data.

According to a 19th aspect of the present invention, in the image processing method of the 17th aspect, the object coding processing comprises: a coding condition decision step of deciding a ratio of a bit rate for each of the constituents and a maximum amount of the object coded data stored in the buffer, corresponding to each of the constituents, according to the complexity of each of the constituents, so that the buffer does not underflow or overflow, and the object image data for each of the constituents is coded at a prescribed bit rate on the basis of the ratio of the bit rate for each of the constituents, so that a sum of the bit rates for all the constituents has a fixed value.

According to a 20th aspect of the present invention, in the image processing method of the 17th aspect, an index indicating the complexity of each of the constituents is one of a first value which indicates a variance of pixel values of pixels constituting each of the constituents, a second value which indicates a magnitude of a temporal change of a display image of each of the constituents, a third value which is obtained by weighting a number of bits generated in coding a corresponding constituent in a previously processed frame which was subjected to the coding processing before a target frame as a target of the coding processing, by a ratio of a coefficient indicating characteristics of the constituent between the target frame and the previously processed frame, and a fourth value which indicates a number of generated bits for each of the constituents, which are generated in preliminarily coding the object image data for each of the constituents under prescribed coding conditions.

According to a 21st aspect of the present invention, there is provided an image processing method of subjecting a video signal for displaying a prescribed image, to an object coding processing of coding object image data for plural constituents of the prescribed image separately for each constituent, to convert the object image data into object coded data, in which the object coding processing comprises: a complexity measurement step of measuring complexity of each of the constituents, which corresponds to a number of bits required for the coding processing of each of the object image data; and a coding condition decision step of deciding a ratio of a bit rate of the object coded data for each of the constituents among the plural constituents, and a maximum amount of the object coded data stored in the buffer at a decoding end, corresponding to each of the constituents, according to a ratio of the complexity of each of the constituents to a sum of the complexities of all the constituents, and the object image data for each of the constituents is coded at a prescribed bit rate on the basis of the ratio of the bit rate for each of the constituent, so that a sum of the bit rates for all the constituents has a fixed value.

An image processing apparatus according to a 22nd aspect of the present invention, which subjects a vide signal for displaying a prescribed image, to an object coding processing of coding object image data for plural constituents of the prescribed image separately for each constituent, to convert the object image data into object coded data, comprises: a complexity measurement unit for measuring complexity of each of the constituents, which corresponds to a number of bits required for the coding processing for each of the object image data; a coding condition decision unit for deciding an individual bit rate for each of the constituents and an individual buffer size for each of the constituents as a maximum amount of the object coded data stored in a buffer at a decoding end, according to the complexity of each of the constituents; a controller for outputting a control signal on the basis of the decided individual bit rate and individual buffer size; an encoder for performing the coding processing for the object image data for each of the constituent, with controlling a number of bits generated by the coding processing on the basis of the control signal, and outputting the objet coded data for each of the constituents; and a multiplexer for multiplexing the object coded data for the constituents, to generate a bitstream.

According to a 23rd aspect of the present invention, in the image processing apparatus of the 22nd aspect, the coding condition decision unit distributes a maximum transmission bit rate of a transmission path to each of the constituents according to the complexity of each of the constituents, to decide the individual bit rate for each of the constituents, and distributes a maximum data storage amount of the buffer at the decoding end to each of the constituents according to the complexity of each of the constituents, to decide the individual buffer size.

According to a 24th aspect of the present invention, there is provided a data storage medium which contains an image processing program, in which the image processing program is a program for executing the coding processing for video signals according to the image processing method of the 17th aspect, by a computer.

According to the 17th to 24th aspects of the present invention, the transmission rate of compressed data (coded data) for an object can be adapted to an actual communication line having a restricted data transmission speed.

DETAILED DESCRIPTION OF THE PREFERRED EMBODIMENTS

Hereinafter, embodiments of the present invention will be described.

Embodiment 1

Figure 1:
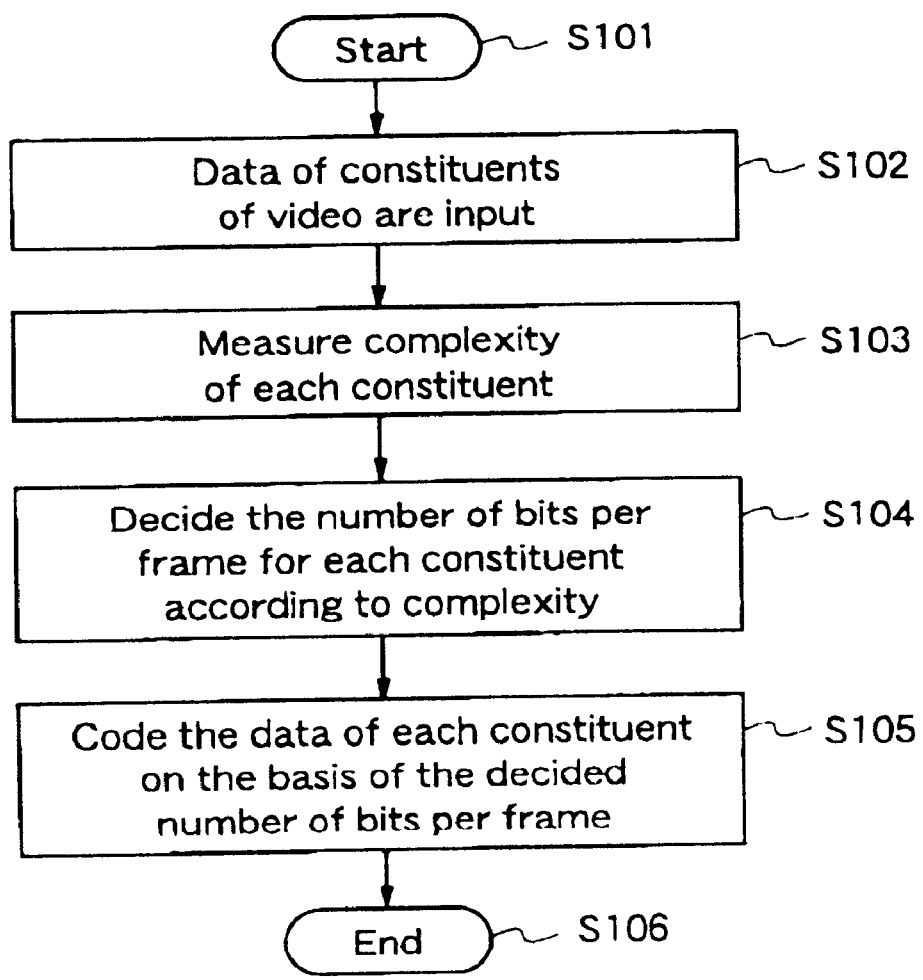
FIG. 1 is a flowchart for explaining an image processing method according to a first embodiment of the present invention, and it schematically shows a coding process according to the image processing method.

FIG. 1 is a flowchart for explaining an image processing method according to a first embodiment of the present invention, and it schematically shows a coding process according to the image processing method.

This first embodiment corresponds to claims 1–13.

Initially, when this coding process is started (step S101), image data for plural constituents (objects) constituting a video signal for a prescribed image (object image data) are input (step S102).

Next, complexity of an image corresponding to each of the constituents of one frame is measured (step S103). In this first embodiment, a variance of pixel values of pixels of each of the constituents is used as the complexity of the image of one frame. To be specific, the average of all pixel values of a constituent corresponding to one frame is obtained, then absolute values of differences between the respective pixel values and the obtained average are obtained, and the sum of all the absolute values is used as the variance. When the sizes of the constituents are different from each other, the variances are further normalized according to the sizes of the respective images of the constituents.

Then, the number of bits per frame of corresponding coded data, which are allocated to each constituent is decided according to the measured complexity (step S104). The image data of each constituent is coded on the basis of the decided number of bits per frame (step S105). Accordingly, the coding process is finished (step S106).

Here, the index for deciding the number of bits per frame is not limited to the variance. For example, the number of bits per frame can be decided with the size of motion of each constituent as the index. To be specific, the number of bits allocated to an image of a still constituent is larger and the number of bits allocated to an image of a constituent having a large motion is smaller.

Hereinafter, an image processing apparatus (image coding apparatus) for performing the coding process according to the image processing method of the first embodiment and an image processing apparatus (image decoding apparatus) for decoding coded data generated by the coding process will be described.

Figure 2:
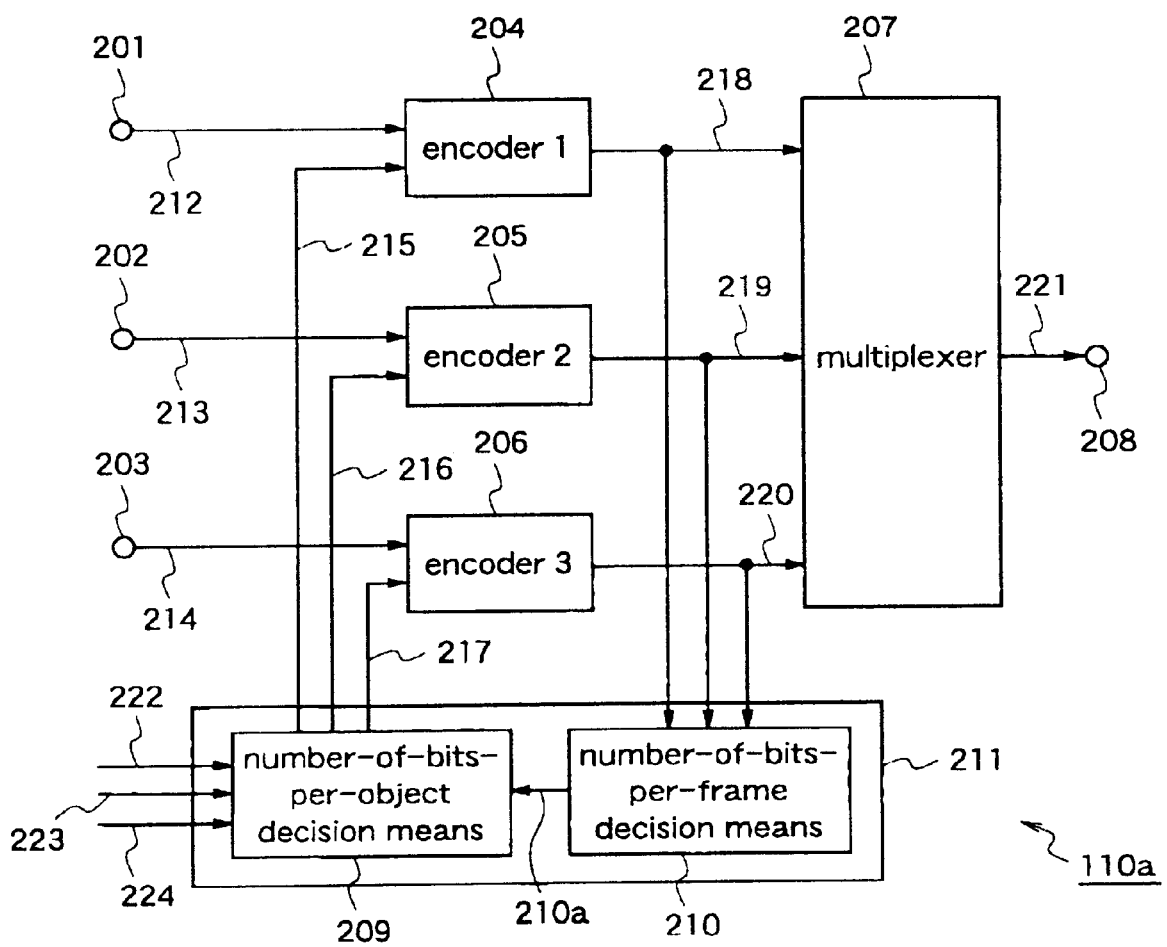
FIG. 2 is a block diagram illustrating an image coding apparatus (image processing apparatus) of the first embodiment.

FIG. 2 is a block diagram illustrating the image coding apparatus.

The image coding apparatus 110a includes a first encoder 204 for coding image data 212 for a first object (constituent) in accordance with a control signal 215 and outputting coded data 218, a second encoder 205 for coding image data 213 for a second object (constituent) in accordance with a control signal 216 and outputting coded data 219, and a third encoder 206 for coding image data 214 for a third object (constituent) in accordance with a control signal 217 and outputting coded data 220.

The image coding apparatus 110a further includes a multiplexer 207 for multiplexing the coded data 218, 219 and 220 for the respective objects and outputting a multiple bitstream 221, and a rate controller 211 for generating the control signals 215, 216 and 217 on the basis of information 222, 223 and 224 indicating complexities of image of the first, second and third objects and the respective coded data 218, 219 and 220.

The rate controller 211 comprises a decision means 210 for deciding the number of bits per frame (hereinafter referred to also as number-of-bits-per-frame decision means 210), which are allocated to a composed image obtained by composing the images of the respective objects, on the basis of the coded data 218, 219 and 220 from the respective encoders 204, 205 and 206 and outputting information 210a of number of bits per frame, and a decision means 209 for allocating the number of bits per frame of the composed image to the respective constituents on the basis of the information 222–224 indicating the complexities of the images of the respective objects and the number-of-bits-per-frame information 210a and deciding the numbers of bits per frame of the respective constituents (hereinafter referred to also as number-of-bits-per-object decision means 209).

In FIG. 2, the image data of the respective objects are input to input terminals 201, 202 and 203, respectively, and the multiple bitstream 221 is output from an output terminal 208.

Figure 15:
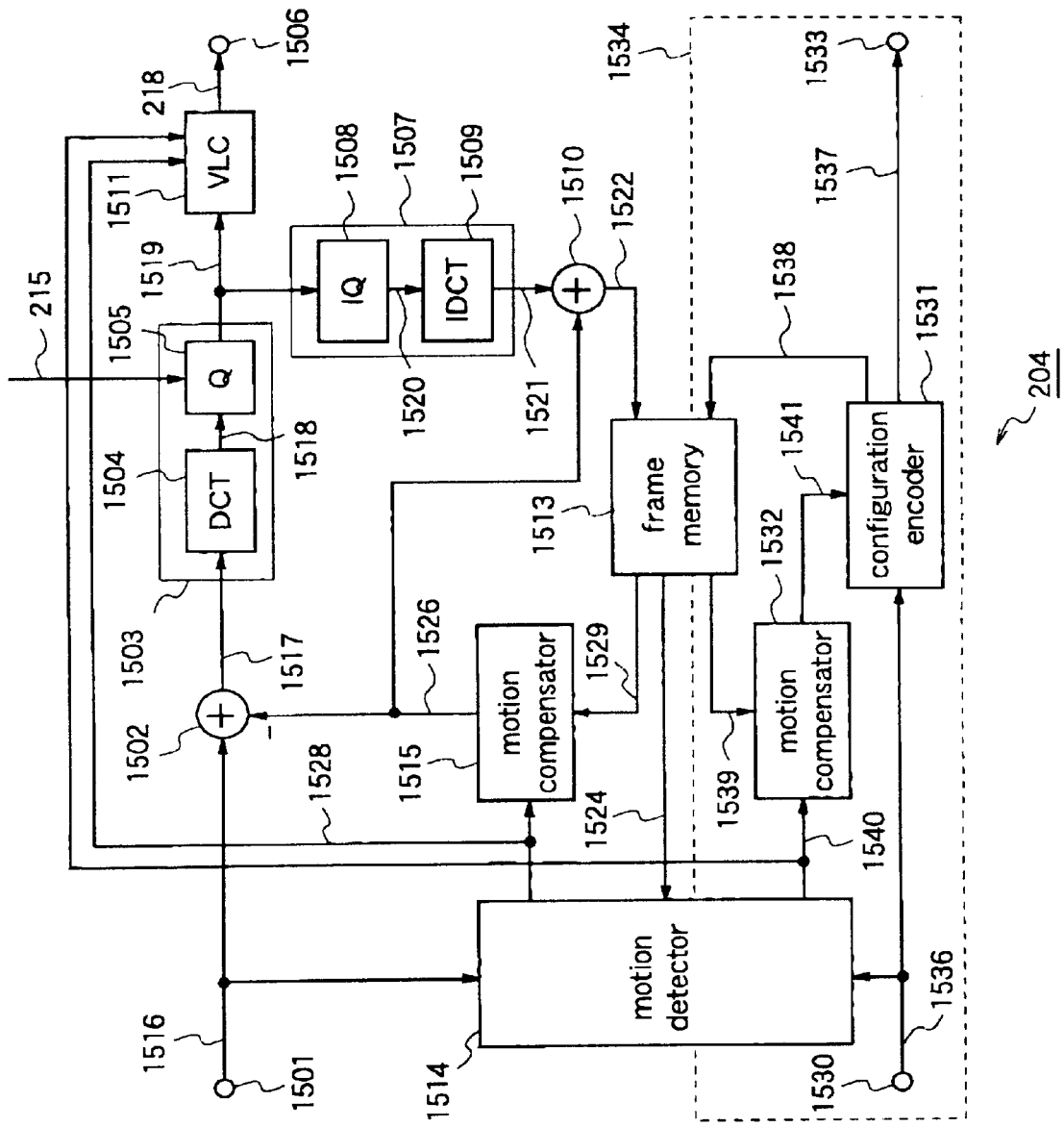
FIG. 15 is a block diagram illustrating a structure of an encoder of the image coding apparatus of the first embodiment.

FIG. 15 is a block diagram illustrating a specific structure of the first encoder. Here, only the structure of the first encoder 204 is illustrated. However, the second and third encoders 205 and 206 have the same structures as that of the first encoder 204.

The first encoder 204 codes image data corresponding to an object, i.e., arbitrary shaped image. The image data corresponding to the arbitrary shaped image includes texture data representing the design (texture), including luminance signals and color difference signals, and configuration data representing the configuration of the image (which is called also significant signal or configuration signal). The significant signals show whether respective samples (pixels) constituting the texture are included in the object. The samples in the object are significant and the samples which are not included in the object are insignificant. In this first embodiment, when a sample of the texture is insignificant, the value of the corresponding significant signal is 0. When the corresponding significant signal has a value other than 0, the sample of the texture is significant.

To be specific, the first encoder 204 has a blocking unit (not shown) for dividing texture data Ts for each frame of the first object so as to correspond to blocks each block consisting of 16×16 pixels as a unit for the coding process, and outputting image data 1516 corresponding to each block. This image data 1516 is supplied to the input terminal 1501.

The encoder 204 further includes a first adder 1502 for outputting differential data 1517 obtained by subtraction between the image data 1516 of a target block in a frame to be processed, to which the coding process is performed (coding target block) and predicted data 1526 corresponding to this data 1516, an information compressor 1503 for subjecting the output 1517 of the first adder 1502 to information compression, and a variable length coder (VLC) 1511 for subjecting an output 1519 of the information compressor 1503 to variable length coding and outputting coded data 218 to an output terminal 1506.

The information compressor 1503 comprises a DCT unit 1504 for subjecting the differential data 1517 to discrete cosine transformation for transforming data of spatial area into data of frequency area, and a quantizer 1505 for quantizing an output 1518 of the DCT unit 1504 in accordance with the control signal 215 from the number-of-bits-per-object decision means 209 to generate a quantized coefficient and outputting the quantized coefficient as the output 1519 of the information compressor 1503. The quantizer 1505 has a quantization step derivation unit (not shown) for deriving a quantization step on the basis of the number of bits per frame of the first constituent, which is supplied from the decision means 209 as the control signal 215. The output 1518 of the DCT unit 1504 is quantized in the derived quantization step.

The discrete cosine transformation is performed in units of small blocks each consisting of 8×8 pixels, which are obtained by dividing the block consisting of 16×16 pixels into four.

The first encoder 204 further includes an information decompressor 1507 for subjecting the output 1519 of the information compressor 1503 to information decompression, and a second adder 1510 for adding an output 1521 of the information decompressor 1507 and the predicted data 1526 and outputting reproduced data 1522.

The information decompressor 1507 comprises an inverse quantizer 1508 for subjecting the output 1519 of the information compressor 1503 to inverse quantization, and an IDCT unit 1509 for subjecting an output 1520 of the inverse quantizer 1508 to inverse DCT of transforming data of frequency area into data of spatial area.

The first encoder 204 further includes a frame memory 1513 for containing the output (reproduced data) 1522 of the second adder 1510 as reference image data for a frame to be processed subsequently, and a motion compensator 1515 for reading the predicted texture data 1526 from the frame memory 1513 on the basis of a texture motion vector 1528.

The first encoder 204 further includes a blocking unit (not shown) for dividing configuration data corresponding to each frame of the first object so as to correspond to blocks each consisting of 16×16 pixels as units for the coding process, and outputting configuration data 1536 corresponding to each block. This configuration data 1536 is supplied to an input terminal 1530.

The first encoder 204 further includes a configuration encoder 1531 for subjecting the configuration data 1536 to configuration coding and outputting configuration coded data 1537 from an output terminal 1533 as well as outputting data which is obtained by decoding the configuration coded data to the frame memory 1513 as reference configuration data 1538, and a configuration motion compensator 1532 for reading predicted configuration data 1541 from the frame memory 1513 on the basis of a configuration motion vector 1540.

The first encoder 204 further includes a motion detector 1514 for obtaining the texture motion vector 1528 and the configuration motion vector 1540 corresponding to the target block of a presently processed frame, on the basis of reference texture data and reference configuration data 1524 for the presently processed frame, stored in the frame memory 1513, and the texture data 1516 and configuration data 1536 of the target block, and outputting these vectors.

Hereinafter, the operation of the arbitrary shaped image coding apparatus 110a constituted as described above will be described.

In the coding apparatus 110a of the first embodiment, a video signal corresponding to an image which comprises plural different constituents is coded.

To be specific, when the video signal comprises image data corresponding to three constituents (bird, cloud and blue sky), data of image sequences corresponding to the bird, cloud, and blue sky are input to the input terminals 201, 202 and 203, respectively. The sequence in this case is a time sequence. The image comprises plural frames as display units and the time sequence of the frame is video. In the video signal including image data which correspond to the plural constituents, a frame at a certain display time comprises images of the plural constituents. In an example described here, an image of a predetermined scene is obtained by composing the images of bird, cloud and blue sky at the certain display time. This image coding apparatus processes data corresponding to rectangular shaped images or arbitrary shaped images as coding target data. For example in this case, the blue sky is a rectangular shaped image and used as the background. The bird and cloud are arbitrary shaped images each having an arbitrary shape.

When the image data 212, 213 and 214 corresponding to the respective constituents are input to the input terminals 201, 202 and 203, these image data are coded by the corresponding encoders 204, 205 and 206 in accordance with the control signals 215, 216 and 217, respectively. At this time, in the rate controller 211, the number of bits per frame which are allocated to one frame of the composed image is obtained by the number-of-bits-per-frame decision means 210 on the basis of the compressed data from the respective encoders. Further, this number of bits per frame is divided on the basis of the complexities of the images of the respective objects, whereby the numbers of bits allocated to coded data of one frame of the respective objects are obtained. Then, information indicating these numbers of bits allocated to the coded data of one frame of the respective objects are output to the respective encoders 204, 205 and 206 as the control signals 215, 216 and 217, respectively.

Hereinafter, operations of the respective encoders will be described. Since the operations of the second and third encoders are the same as that of the first encoder, only the operation of the first encoder is described here.

When the texture data 1516 and configuration data 1536 corresponding to an arbitrary shaped image (image of an object) are input to the input terminals 1501 and 1530, respectively, the motion detector 1514 performs a motion detection process using the texture data 1516 and configuration data 1536.

In this first embodiment, each of the texture data and configuration data which are input to the respective input terminals 1516 and 1530 is data corresponding to a block consisting of 16×16 samples. In the motion detector 1514, displacement information (motion vector) of a motion corresponding to a target block to be coded is detected by referring reference data stored in the frame memory 1513 according to a method such as the block matching method. The reference data is obtained by decoding coded texture data and coded configuration data corresponding to an already processed block which was already subjected to the coding process.

At this time, the motion vector 1540 for the configuration data of the target block is supplied to the configuration motion compensator 1532, and the configuration predicted data 1541 is generated by the compensator 1532 from configuration components of the reference data. Further, the configuration motion vector 1540 is transmitted to the variable length coder (VLC) 1511 and converted into a variable length code.

In the motion compensator 1532, the configuration predicted data 1541 for the target block is generated from the reference configuration data stored in the frame memory 1513 on the basis of the configuration motion vector 1540.

When the configuration data of the target block and the configuration predicted data generated by the motion compensator 1532 are input to the configuration encoder 1531, the configuration data of the target block is subjected to arithmetic coding with referring to the configuration predicted data in the same way as MPEG4 system, and configuration coded data 1537 is output to the output terminal 1533. On the other hand, configuration decoded data 1538 which is obtained by subjecting the configuration coded data to a decoding process in the configuration encoder 1531 is transmitted to the frame memory 1513 and stored as the reference configuration data.

When the motion vector 1528 for the texture data is supplied to the motion compensator 1515, the predicted texture data 1526 for the target block is generated by the compensator 1515 from the reference texture data. At this time, the motion vector 1528 is transmitted to the variable length coder (VLC) 1511 and converted into a variable length code.

When the texture data 1516 and predicted texture data 1526 for the target block are supplied to the first adder 1502, the differential data 1517 of these data is obtained and this differential data 1517 is compressed by the information compressor 1503. In this first embodiment, this differential data 1517 is subjected to frequency transformation and quantization by the DCT unit 1504 and the quantizer 1505, respectively, and converted into the compressed data 1519.

The quantized data, i.e., compressed data 1519 is converted into a variable length code by the variable length coder (VLC) 1511, and output from the output terminal 1506 together with other side information including the motion vector.

Then, the variable length codes output from the output terminals 1506 and 1533 are arranged in a prescribed order and transmitted as the coded data 218 to the multiplexer 207 as shown in FIG. 2.

The image data for the second and third objects are also coded in a similar way to the image data for the first object and the respective corresponding coded data 219 and 220 are supplied to the multiplexer 207.

In the multiplexer 207, the coded data for the respective objects are multiplexed and output as one bitstream (multiplex coded data) 221. This bitstream is reproduced by an image decoding apparatus at the receiving end.

Figure 3:
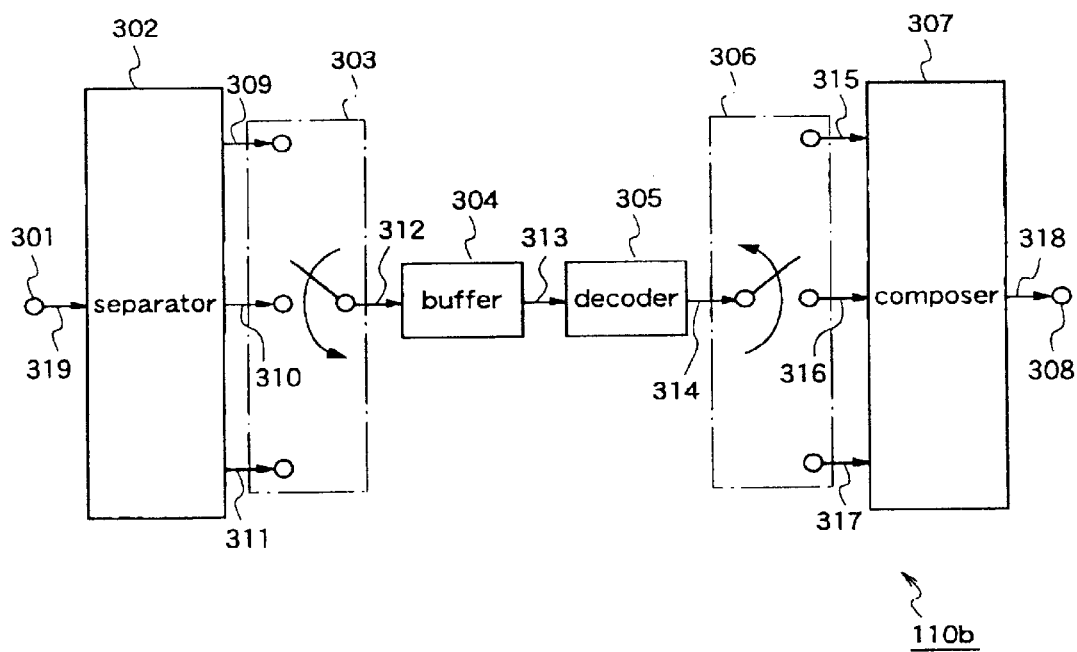
FIG. 3 is a block diagram illustrating an image decoding apparatus (image processing apparatus) according to the first embodiment.

FIG. 3 is a block diagram illustrating an image decoding apparatus of the first embodiment.

This image decoding apparatus 110*b* includes a separator 302 for receiving the multiplex bitstream 221 from the image coding apparatus 110*a* as input data 319, and extracting coded data 309, 310 and 311 for the respective objects from the input data 319, a buffer 304 for containing the coded data 309, 310 and 311 for the respective objects, and a first switch 303, which is provided between the buffer 304 and the separator 302, for selecting one of the coded data for the respective objects, which are output by the separator 302, and outputting selected coded data to the buffer 302. Here, a signal 312 is a selection output of the switch 303, i.e., a signal selected by the switch.

The image decoding apparatus 110*b* further includes a decoder 305 for decoding the coded data stored in the buffer 304 and outputting decoded data 314 for the respective objects, a second switch 306 for separating decoded data 315, 316 and 317 for the respective objects, which are included in the decoded data 314 output by the decoder 305, and outputting separated data, and a composer 307 for composing the decoded data 315, 316 and 317 for the respective objects output by the switch 306, and outputting reproduced data 318 corresponding to the composed image.

In FIG. 3, the multiplex bit stream 221 from the image coding apparatus 110*a* is input to an input terminal 301 of the decoding apparatus 110*b*. The reproduced data 318 is output from an output terminal 308 of the decoding apparatus 110*b*.

Figure 16:
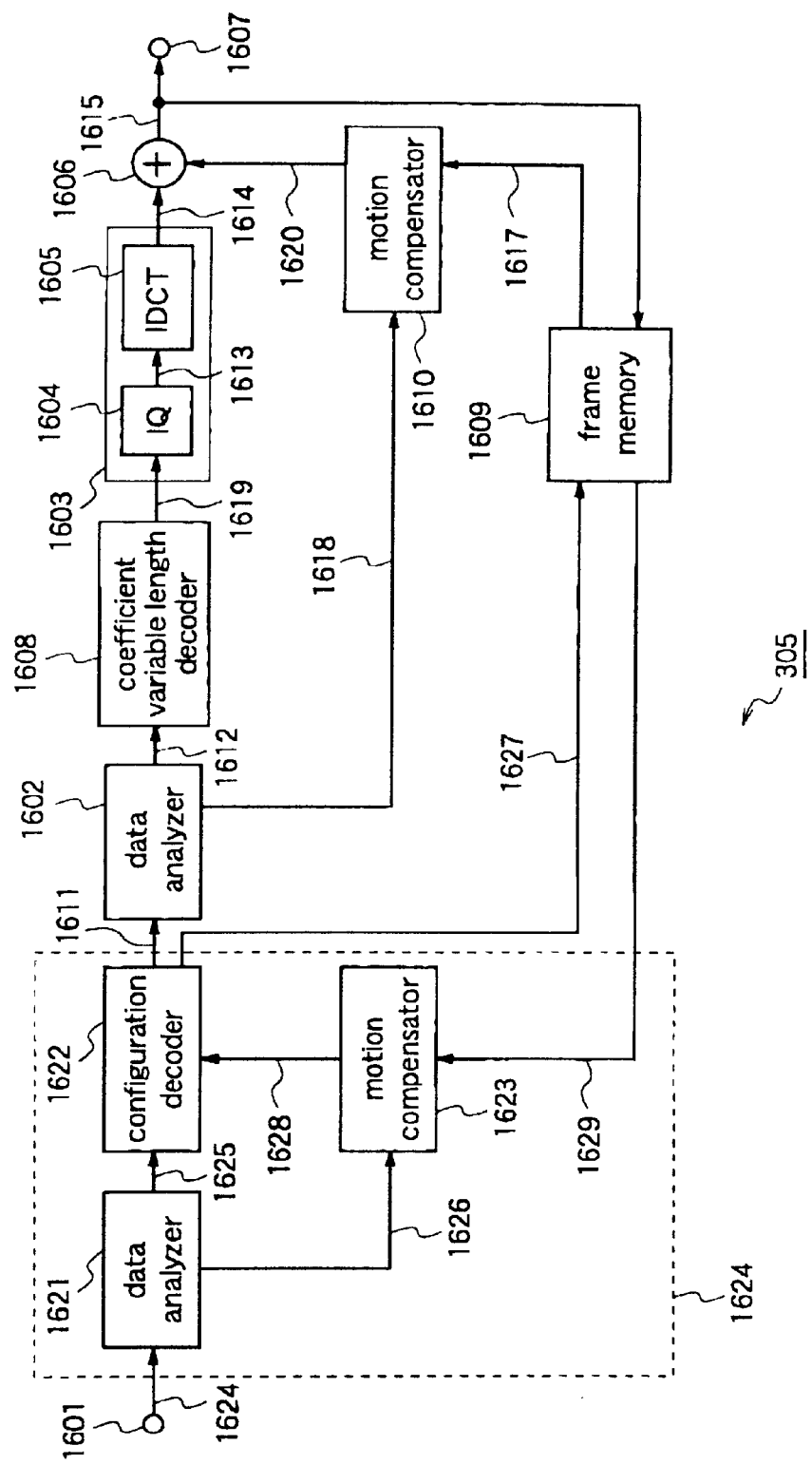
FIG. 16 is a block diagram illustrating a decoder of the image decoding apparatus of the first embodiment.

FIG. 16 is a block diagram illustrating a specific structure of the decoder.

This decoder 305 includes a first data analyzer 1621 for analyzing the coded data (hereinafter referred to also as compressed data) for the respective objects and outputting a configuration motion vector 1626 of a target block to be decoded, a motion compensator 1623 for generating predicted configuration data 1628 for the target block from reference configuration data 1629 on the basis of the configuration motion vector 1626, and a configuration decoder 1622 for generating configuration decoded data 1627 for the target block on the basis of compressed data 1625 which passed the first data analyzer 1621 and the predicted configuration data 1628.

The decoder 305 further includes a second data analyzer 1602 for analyzing coded data 1611 which passed the configuration decoder 1622 and extracting a texture motion vector 1618 for the target block and a variable length code 1612 for quantized coefficient, and a motion compensator 1610 for generating predicted texture data 1620 for the target block from reference texture data 1617 on the basis of the texture motion vector 1618.

The decoder 305 further includes a coefficient variable length decoder 1608 for subjecting the variable length code 1612 to variable length decoding and generating the quantized coefficient 1619, an information decompressor 1603 for subjecting the quantized coefficient 1619 to an information decompression process and outputting decoded data 1614, and an adder 1606 for adding the decoded data 1614 and the predicted data 1620 and outputting reproduced data 1615. Here, the information decompressor 1603 comprises an inverse quantizer 1604 for subjecting the quantized coefficient 1619 to inverse quantization and generating frequency area data 1613, and an IDCT unit 1605 for subjecting the frequency area data 1613 to inverse frequency transformation and outputting spatial area data as the decoded data 1614 for the target block.

The decoder 305 further includes a frame memory 1609 for containing the decoded configuration data 1627 and the reproduced texture data 1615 as well as outputting the reference configuration data 1629 and the reference texture data 1617 to the motion compensators 1623 and 1610, respectively.

Next, the operation of the image decoding apparatus 10b will be described.

When the bitstream 319 is input from the transmission end to the input terminal 301, the separator 302 separates the bitstream into the coded data corresponding to the respective constituents and transmits the separated coded data to the buffer 304 via the selector switch 303. The coded data for all the constituents are stored in the buffer 304.

This buffer 304 is the one for absorbing changes in the number of bits per frame for each object, among plural objects. Bit strings of the coded data of the respective objects are input to the buffer 304 at a prescribed rate (transmission rate). When data corresponding to one frame of the composed image at a certain display time is accumulated in this buffer, the coded data is successively read from the buffer to the decoder 305 and decoded by the decoder 305.

The decoded data for the respective constituents which are obtained by the decoding process in the decoder 305 are transmitted to the composer 307 via the selector switch 306. In the composer 307, the decoded data 315, 316 and 317 for the respective constituents are composed and the reproduced data 318 corresponding to a prescribed scene which comprises plural constituents is output to a display apparatus via the output terminal 308.

Hereinafter, the operation of the decoder 305 will be described.

When the bitstream 1624 including the coded texture data and coded configuration data for the respective objects is input to the input terminal 1601, the data analyzer 1621 converts the variable length code corresponding to a configuration motion vector, into the configuration motion vector 1626 having a prescribed value, according to its data analysis. When this configuration motion vector 1626 is output to the motion compensator 1623, the motion compensator 1623 generates the predicted configuration signal 1628 for the target block to be decoded from the reference configuration data 1629 in the frame memory 1609 on the basis of the motion vector.

In the configuration decoder 1622, the configuration decoded data 1627 for the target block is generated on the basis of this configuration predicted signal 1628, and stored in the frame memory 1609. In addition, the coded data 1611 which passed the configuration decoder 1622 is supplied to the second data analyzer 1602.

Subsequently, the decompression process for the coded texture data is performed.

To be specific, in the data analyzer 1602, the variable length code corresponding to a texture motion vector is converted into the texture motion vector 1618 having a prescribed value by data analysis of the coded data 1611, as well as the variable length code 1612 corresponding to the quantized coefficient is extracted. When the motion vector 1618 is transmitted to the motion compensator 1610, the predicted texture signal 1620 for the target block is generated by the motion compensator 1610 on the basis of the motion vector from the reference texture signal in the frame memory 1609.

On the other hand, the variable length code 1612 is converted into the quantized coefficient 1619 having a prescribed value by the coefficient variable length decoder 1608. Then, in the inverse quantizer 1604, the quantized coefficient 1619 is subjected to the inverse quantization, whereby the frequency are data 1613 is generated. This frequency area data 1613 is transformed into the spatial area data 1614 by the inverse frequency transformation in the IDCT unit 1605 and the spatial area data is output as the texture decoded data 1614.

Then, in the adder 1606, the texture decoded data 1614 and predicted texture data 1620 of the target block are added, whereby the reproduced texture data 1615 is generated. This reproduced texture data 1615 is stored in the frame memory 1609.

In this first embodiment, a unit having the structure as shown in FIG. 15 is used as the first to third encoders and a unit having the structure as shown in FIG. 16 is used as the decoder. However, the structures of the encoders and decoder are not limited to these structures.

For example, the encoders can employ any data compression method such as the fractal or wavelet coding and the decoder can employ any data decompression method corresponding to these data compression methods.

In addition in this first embodiment, the image coding apparatus has a structure for coding image data corresponding to three objects as shown in FIG. 2. However, the structure of the image coding apparatus is not limited to this. The image coding apparatus can usually have a structure for coding image data corresponding to an arbitrary number of objects.

Further in this first embodiment, the image coding apparatus has plural input terminals. However, image data corresponding to plural constituents can be input to one input terminal.

Further in this first embodiment, the rectangular shaped image and arbitrary shaped images are used as the constituents. However, the constituents can be only rectangular shaped images. In this case, a configuration coding unit 1534 enclosed by a dotted line in the encoder 204 as shown in FIG. 15 does not operate. Similarly, a configuration decoding unit 1624 enclosed by a dotted line in the decoder 305 as shown in FIG. 16 does not operate either.

As described above, in the image coding apparatus 110a as shown in FIG. 2, the image data for the respective constituents which are input to the input terminals 201, 202 and 203 are coded by the corresponding encoder 204, 205 and 206. The coded image data (coded data) 218, 219 and 220 are transmitted to the multiplexer 207 as well as transmitted to the rate controller 211, respectively.

In the number-of-bits-per-frame decision means 210 of the rate controller 211, the number of bits of the coded data is counted, and the number of bits of a frame to be subsequently processed is decided on the basis of the number of bits which was generated before the presently processed frame.

In the first embodiment, the number of bits of frame (i) is decided on the basis of the numbers of generated bits of the respective constituents of frame (i−1), in a following way.

Here, assume that the number of bits required for coded data which correspond to the number of frames per second of a composed image comprising plural constituents is the total number N of bits.

Initially, at a time when the coding processes for the respective constituents of frame (i−1) are finished, the total number of generated bits is obtained. Assuming that the total number of generated bits at this time is F(i−1), the number R of remaining bits is obtained by N−F(i−1). This number R of remaining bits is used for coding constituents of subsequent or later frames.

Next, the number R of remaining bits is equally divided by the number of remaining frames per second. Accordingly, the number F(i) of bits per frame of frame (i) is obtained.

Then, in the number-of-bits-per-object decision means 209, the number F(i) of bits used for the coding process of a subsequently processed frame (i) is distributed among images of constituents of the image of frame (i).

The distribution of the number of bits per frame is performed on the basis of measured values of the complexities of the respective constituents. In this first embodiment, the complexities of the images of the constituents are measured by any of following methods (1)–(4):

(1) A variance of pixel values constituting image data of each constituent is utilized as the index of the complexity. To be specific, the average of the pixel values corresponding to one frame of the constituent is obtained, absolute values of differences between the pixel values and the average are obtained, and the sum of the absolute values is used as the variance. Here, when the sizes of the constituents are different from each other, the variance is further normalized according to the size of the image.

(2) For an image which is subjected to motion compensation prediction coding, an error between predicted data obtained from image data for a reference frame, and image data for the frame to be processed is utilized as the index of complexity. To be specific, the predicted data obtained from the image data for the reference frame is subtracted from the image data for the frame to be processed in pixel units, and the sum of the absolute values of the differences is utilized as the index of complexity.

(3) The number of generated bits corresponding to each constituent of frame (i−1) is utilized as the estimated value of complexity of each constituent of frame (i). In this case, in order to increase the accuracy of this estimated value, the number of generated bits of each constituent (j) of frame (i−1), which is weighted by using the ratio of the variance for the constituent (j) in frame (i−1) to the variance for the constituent (j) in frame (i) is used as the estimated value of complexity of each constituent of frame (i).

(4) The image data for each constituent of frame (i) is previously coded and the number of bits generated during this coding process is used as the index of complexity of an image of each constituent. In this first embodiment, all the constituents of frame (i) are coded at a fixed quantization width. This method is a plural-times coding method which is used when the delay in the coding process of image data does not matter.

The above-mentioned complexities of the respective constituents are previously measured and information 222, 223 and 224 indicating the complexities are input to the rate controller 211.

In FIG. 2, a structure of a circuit for measuring the complexities is not illustrated.

In the decision means 209, the numbers of bits allocated to the respective constituents are decided on the basis of the decided complexities, and output to the corresponding encoders 204, 205 and 206. In the respective encoders, the coding processes for the image data of the respective constituents are performed so that the number of bits of the coded data becomes the decided number of bits.

Figure 4:
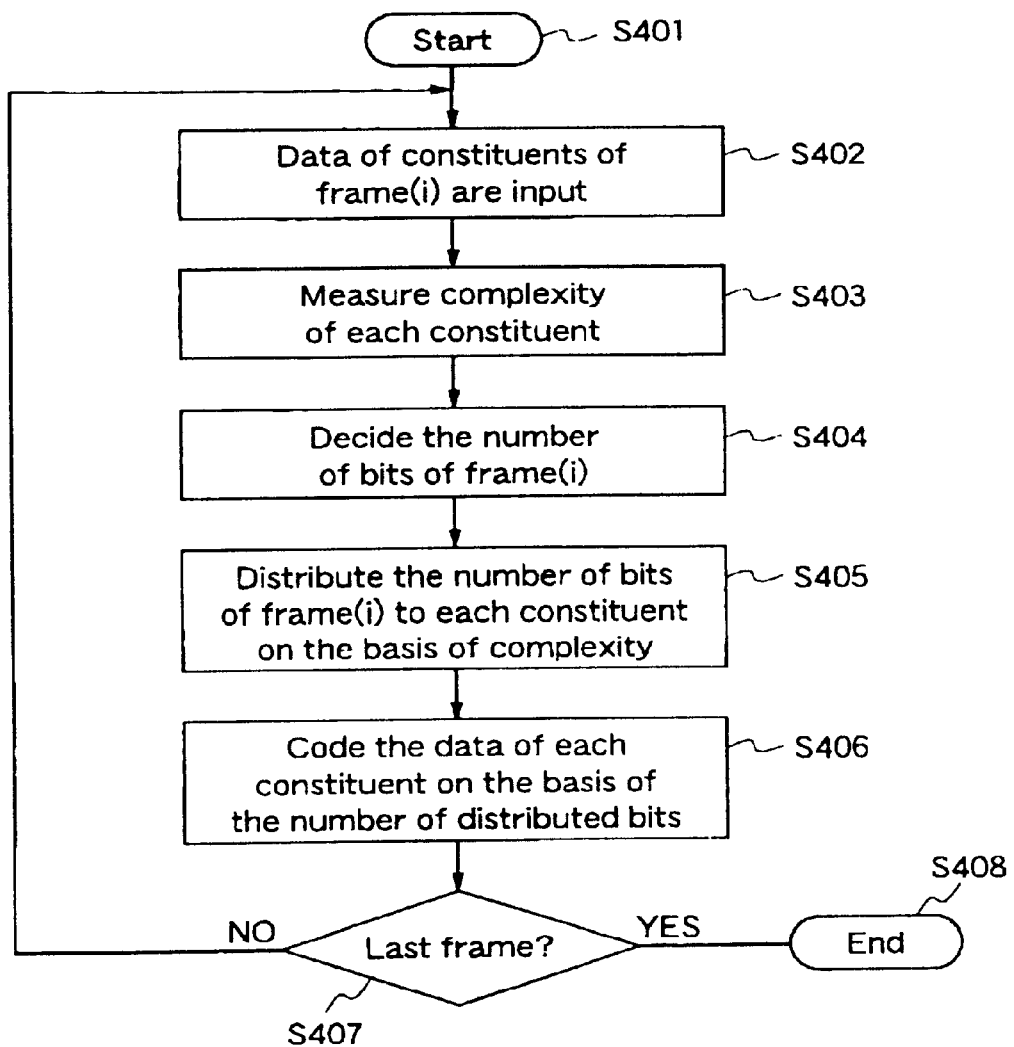
FIG. 4 is a flowchart showing a specific coding process according to the image coding method (image processing method) of the first embodiment.

FIG. 4 is a flowchart for showing the coding process including a specific process in the rate controller 211.

When the coding process is started (step S401), the image data for the constituents of frame (i) are input (step S402).

Next, the complexity of the image of each of the constituents is measured (step S403). The detailed procedure is described above.

Then, the number of bits allocated to frame (i) is decided on the basis of the coded data 218–220 output by the respective encoders (step S404). The detailed procedure is described above.

Further, the number of bits allocated to frame (i) is distributed to each of the constituents on the basis of the complexity of each constituent (step S405). Then, the image data of each of the constituents is coded on the basis of the number of distributed bits for each object (step S406). Thereafter, it is decided whether the presently processed frame as a coding target is the last frame in the image sequence and when it is the last frame, the coding process is finished (step S408) When it is not the last frame, the processes of steps S402–S407 are repeated. In this way, the coding process is repeatedly performed until the last frame is processed.

Figure 5:
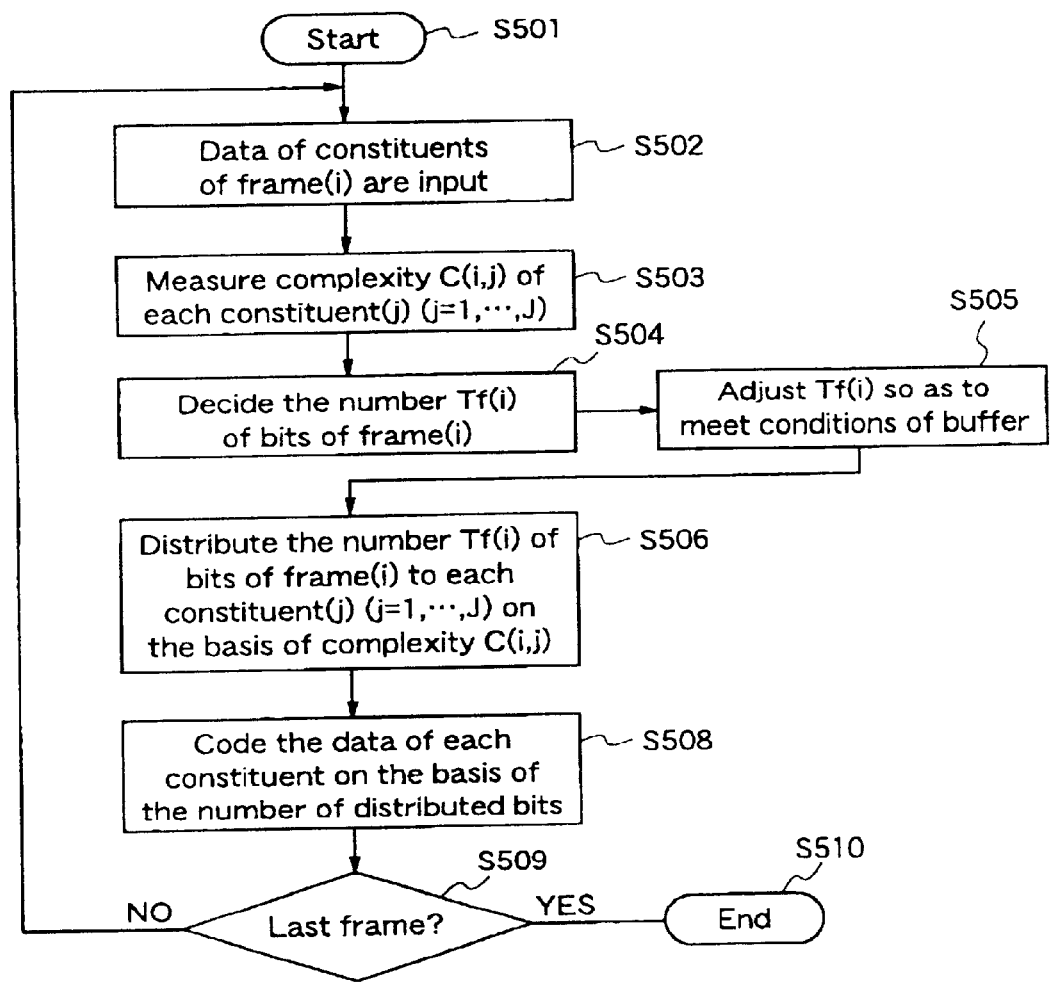
FIG. 5 is a flowchart showing a detailed coding process according to the image coding method (image processing method) of the first embodiment.

FIG. 5 is a flowchart for showing further detailed processes of the image coding method of the first embodiment.

When the coding process is started (step S501), the image data for the constituents of frame (i) are input (step S502). In a following step S503, the complexity C(i,j) of each constituent (j) of the image of frame (i) is measured. The detailed procedure is described above.

In step S504, the number Tf(i) of bits allocated to the coded data of frame (i) is decided. The detailed procedure is described above. In step S505, the number Tf(i) of bits per frame is adjusted so as to satisfy conditions of the buffer 304 in the image decoding apparatus 110b. That is, the number Tf(i) of bits per frame is required to satisfy the following conditions so that the buffer 304 does not brim over or is not emptied:

$$B(i-1)+2R/P-B<Tf(i)\leq B(i-1)+R/P \qquad (1)$$

Here, B(i−1) is the amount of occupation of the buffer by data at a time when the coded data for frame (i−1) at a display time (i−1) is extracted from the buffer. B is the size (maximum data storage amount) of the buffer 304. R is the bit rate. P is the frame rate.

When the above conditions are not satisfied, i.e., when the number Tf(i) of bits per frame is equal to or less than the minimum value of the range which is given by the relationship (1), the number Tf(i) of bits per frame is set to the upper limit. On the other hand, the number Tf(i) of bits per frame is more than the maximum value of the range given by the relationship (i), the number Tf(i) of bits per frame is set to the lower limit.

Then in step S506, the number Tf(i) of bits of frame (i) is allocated to each of the constituents on the basis of the complexity C(i,j) for the images of the constituent (j) of frame (i). To be specific, the allocation of the number Tf(i) of bits is performed according to the following relationship (2):

$$To(i,j)=Tf(i)\times C(i,j)/C(i,j) \qquad (2)$$

That is, the number Tf(i) of bits is distributed according to the ratio of the complexity of the image of the constituent (j) to the sum of the complexities of the respective constituents (j) [j=1, 2, . . . , J] of frame (i).

Finally, the coding process for the image data of each of the constituents is performed on the basis of the number of bits allocated to each of the constituents (step S508). Thereafter, it is decided whether the presently processed frame as a coding target is the last frame of the image sequence (step S509). When it is the last frame, the coding process is finished (step S510). When it is not the last frame, the processes of steps S502–S509 are repeated. In this way, the coding process is repeatedly performed until the last frame is processed.

As described above, in this first embodiment, the image decoding apparatus at the receiving end, which subjects coded data for each constituent of a scene to the decoding and composition processes, has one buffer for containing the coded data for the respective constituents, and the coded data for all the constituents of one frame are stored in this buffer. Therefore, one buffer can be commonly used by coded data of plural constituents, whereby the buffer can be effectively utilized.

In addition, the number of bits is kinetically allocated to the respective constituents so that the sum of the numbers of bits allocated to all the constituents does not exceed the capacity of the buffer. Therefore, the number of bits allocated to a constituent whose image is simple can be reduced and the number of bits allocated to a constituent whose image is complex can be increased, whereby the quality of the whole image can be improved.

Figure 6:
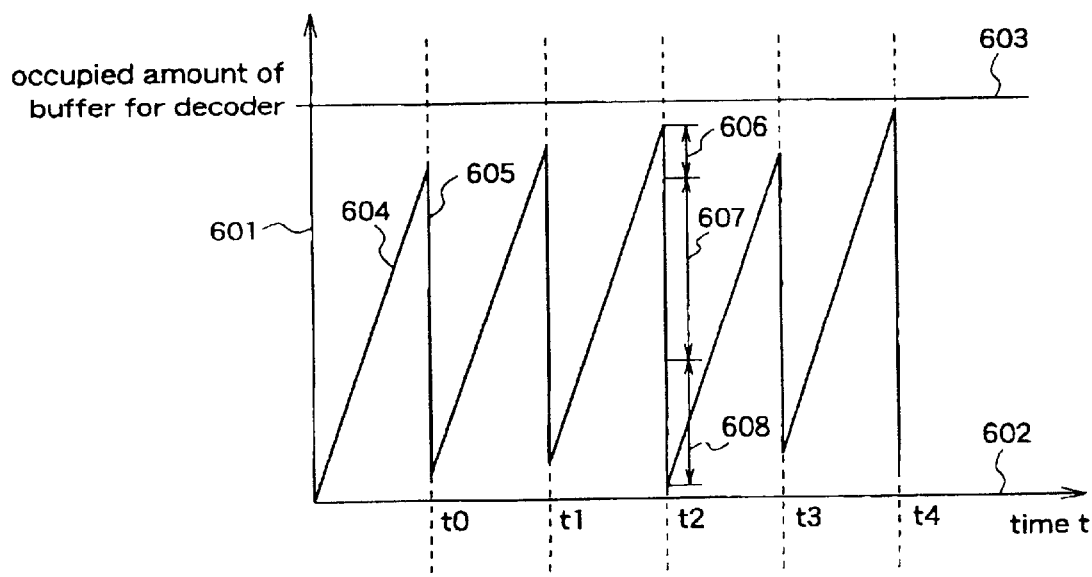
FIG. 6 is a diagram schematically showing a state of a buffer for a decoder at the receiving end which is occupied by coded data obtained by a processing according to the image coding method of the first embodiment, using temporal transition of the occupied amount of the buffer.

FIG. 6 shows by a graph transition of the amount of occupation by data of the buffer 304 in FIG. 3. The vertical axis shows the amount of occupation of the buffer by data. The horizontal axis shows the time. The inclination of an inclined part 604 in this graph shows a bit rate which is obtained by averaging bit rates of the coded data for all the constituents. Bit strings constituting the coded data of all the constituents are input to the buffer 304 at this obtained rate.

The length of the vertical line part 605 in the graph shows the total number of bits allocated to all the constituents of a frame at a display time t1.

This total number of bits can be distributed optimally according to the complexities of constituents. For example, at a display time t2, the buffer is occupied by the coded data almost up to its capacity. Among the coded data in the buffer, a smaller number of bits is allocated to coded data for a simple constituent shown by the length of a line segment 606 and a larger number of bits is allocated to coded data for a complex constituent shown by the length of a line segment 607. Consequently, the quality of the image of the whole frame is increased.

Embodiment 2

Figure 7:
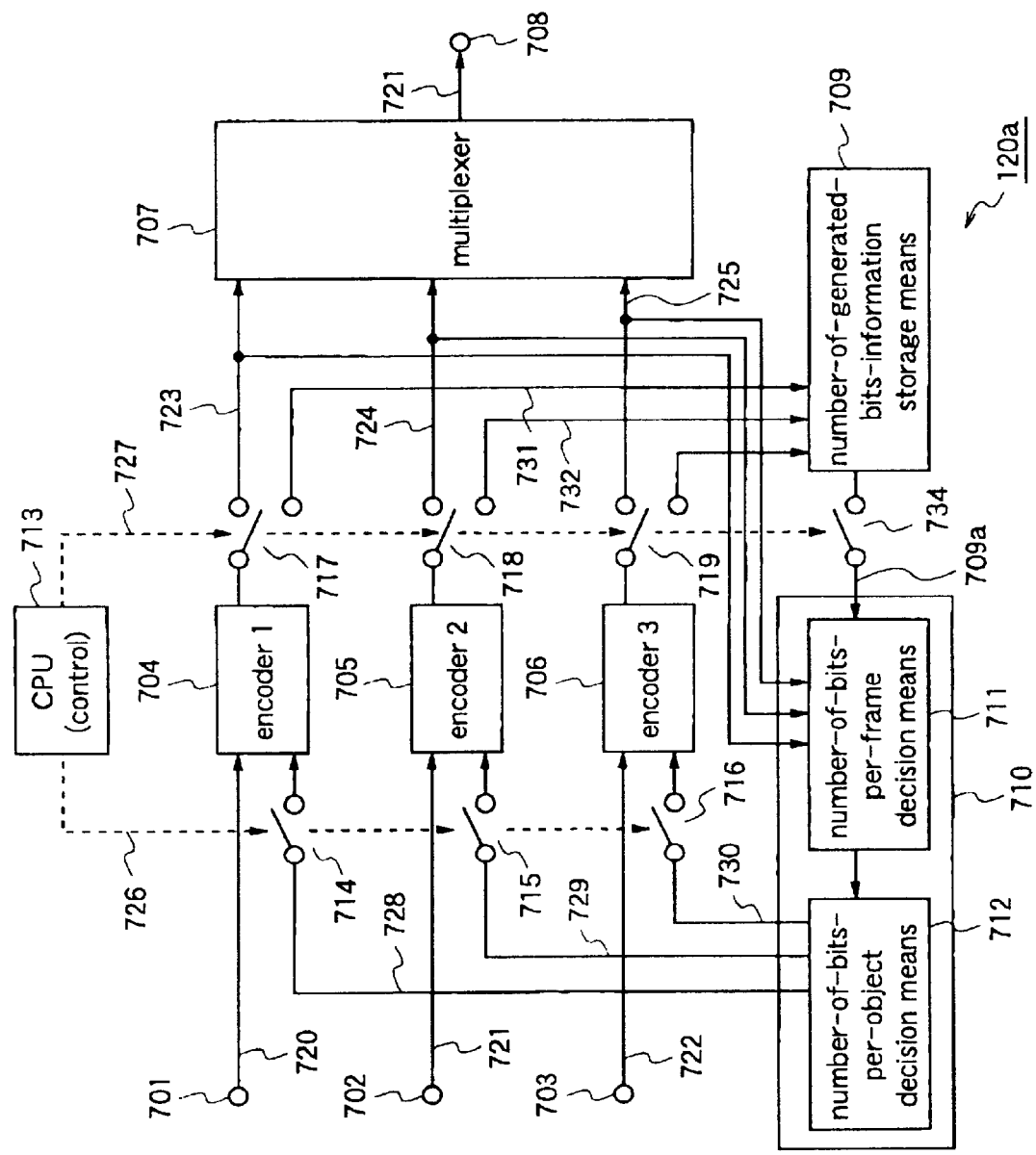
FIG. 7 is a block diagram illustrating an image coding apparatus (image processing apparatus) according to a second embodiment of the present invention.

FIG. 7 is a block diagram illustrating an image coding apparatus (image processing apparatus) according to a second embodiment of the present invention.

This second embodiment corresponds to claims 1, 2 and 4–16.

An image coding apparatus 120a of the second embodiment includes a first encoder 704 for coding image data 720 for a first object (constituent) in accordance with a control signal 728 and outputting coded data 723, a second encoder 705 for coding image data 721 for a second object (constituent) in accordance with a control signal 729 and outputting coded data 724, and a third encoder 706 for coding image data 722 for a third object (constituent) in accordance with a control signal 730 and outputting coded data 725.

The image coding apparatus 120a further includes a multiplexer 707 for multiplexing the coded data 723, 724 and 725 for the respective objects and outputting a multiplex bitstream 721, and a storage means 709 for containing the numbers of bits per frame which are generated in coding the image data of the first, second and third objects for each frame (hereinafter referred to also as number-of-generated-bits-information storage means 709), and a rate controller 710 for generating the control signals 728, 729 and 730 on the basis of information of the number of generated bits and the coded data 723, 724 and 725.

Here, the rate controller 710 comprises a number-of-bits-per-frame decision means 711 for deciding the number of bits per frame allocated to a composed image comprising the respective objects, on the basis of the information 709a of the number of generated bits and the coded data 723, 724 and 725 from the respective encoders 704, 705 and 706, and a number-of-bits-per-object decision means 712 for allocating the number of bits per frame of the composed image to the respective constituents, using the numbers of bits per frame of the respective objects, which are stored in the storage means 709, as indexes indicating the complexities of images of the respective objects, thereby to decide the numbers of bits per frame of the respective constituents.

In addition, switches 714, 715 and 716 are provided between the number-of-bits-per-object decision means 712 and the respective encoders 704, 705 and 706. The information 728, 729 and 730 of number of bits from the decision means 712 are supplied to the respective encoders 704, 705 and 706 via the switches 714, 715 and 716, respectively.

Further, selector switches 717, 718 and 719 are provided at latter stages of the respective encoders 704, 705 and 706, respectively. The coded data 723, 724 and 725 output by the respective encoders are supplied to either the multiplexer 707 or the storage means 709 via the selector switches 717, 718 and 719, respectively.

In addition, a switch 734 is provided between the storage means 709 and the decision means 711. The information of the number of bits for the respective objects is supplied to the decision means 711 via the switch 734.

The image coding apparatus 120a has a CPU 713 as a control means for controlling the respective switches 714–716 and 734 and the selector switches 717–719. The respective switches are controlled by the CPU 713 in following manners. When a preliminary coding process is performed, the respective switches 714–416 and 734 are opened as well as the respective encoders are connected to the storage means 709 by the selector switches 717–179. On the other hand, when a main coding process is performed, the respective switches 714–416 and 734 are closed as well as the respective encoders are connected to the multiplexer 707 and the decision means 711 by the selector switches 717–719.

Here, the respective encoders 704, 705 and 706 have the same structures as that of the first encoder 204 in the image coding apparatus 110a of the first embodiment as shown in FIG. 15. In addition, in the image coding apparatus 120a, when the preliminary coding process is performed, the quantization processes in the respective encoders are performed in a fixed quantization width (quantization step). When the main coding process is performed, the quantization processes in the respective encoders are performed at a quantization width (quantization step) according to the number-of-bits information 728, 729 and 730 from the decision means 712.

In FIG. 7, image data of respective objects are input to input terminals 701, 702 and 703, respectively. The multiplex bitstream 721 is output from an output terminal 708.

In addition, an image decoding apparatus for decoding the multiplex bitstream 721 output from the image coding apparatus 120a of the second embodiment has the same structure as that of the image decoding apparatus 110b of the first embodiment as shown in FIG. 3.

Next, the operation will be described.

Figure 8:
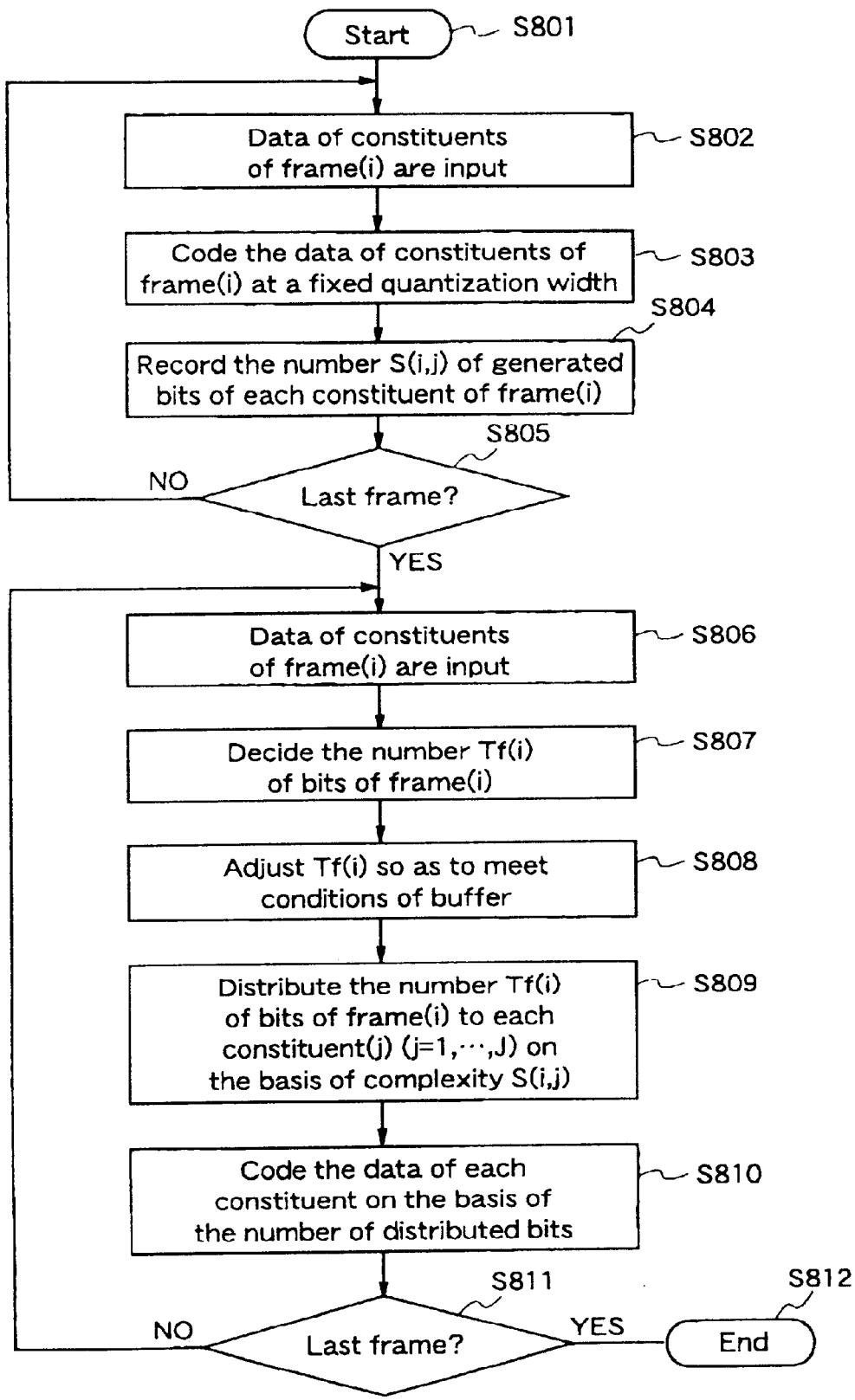
FIG. 8 is a flowchart showing a coding process according to an image coding method (image processing method) of the second embodiment.

FIG. 8 is a flowchart for showing the coding process by the image coding apparatus.

In this second embodiment, like the first embodiment, when the coding process is started (S801), the image data for plural constituents (objects) of frame (i) are input (step S802).

In step S803, the image data of each of the constituents is coded. Here, the preliminary coding process including the quantization process at a fixed quantization width is performed for the image data of each of the constituents.

In step S804, the number $S(i,j)$ of bits of each of the constituents, which are generated by the preliminary coding process is recorded. Here, the number $S(i,j)$ of bits is the number of bits for the constituent (j) of frame (i). Thereafter, it is decided whether the presently processed frame as a coding target is the last frame of the image sequence (S805). When it is not the last frame, the processes of steps S802–S805 are repeated. On the other hand, when it is the last frame, the preliminary coding process is finished. In this way, the preliminary coding process is repeatedly performed until the last frame is processed.

When the preliminary coding process is completed, the main coding process is performed.

That is, the image data for the plural constituents (objects) of frame (i) are input again (step S806).

In step S807, the distribution rate per frame of the number of remaining bits is obtained on the basis of the ratio of complexity of the target frame (i) to be coded to the sum of complexities of frames which are not coded yet. Then, the number $Tf(i)$ of bits of the target frame (i) is decided by multiplying the number of remaining bits by the distribution rate per frame. Here, the number of remaining bits is obtained by subtracting the number of all bits utilized for the already coded frame which was subjected to the coding process, from the total number of bits allocated to the sequence of the image comprising the plural constituents.

In step S808, the number $Tf(i)$ of bits per frame is adjusted so as to satisfy the conditions of the buffer in the image decoding apparatus at the receiving end. The detailed way of the adjustment is the same as that in step S505 in the first embodiment.

Thereafter in step S809, the distribution rate per constituent is obtained on the basis of the ratio of the complexity $S(i,j)$ of a constituent to be coded to the sum $S(i,j)$ of the complexities of the constituents of the target frame (i). The number $To(i,j)$ of bits allocated to the target constituent is decided by multiplying the number $Tf(i)$ of bits of the target frame (i) by the distribution rate per constituent (relationship (3) below).

$$To(i,j)=Tf(i) \times S(i,j)/S(i,j) \qquad (3)$$

Then, each of the constituents of the target frame (i) is coded separately on the basis of the decided number of bits $To(i,j)$ (step S810). Thereafter, it is decided whether the presently processed frame being as a coding target is the last frame of the image sequence (step 5811). When this is not the last frame, the processes of steps S806–S811 are repeated. On the other hand when this is the last frame, the main coding process is finished (step S812). In this way, the main coding process is performed repeatedly until the last frame is processed.

Here, the multiplex bitstream output by the image coding apparatus 120a of the second embodiment is decoded by an image decoding apparatus having the same structure of the image decoding apparatus 110b of the first embodiment as shown in FIG. 3.

As described above, in this second embodiment, in the preliminary coding, the switches 714, 715 and 716 are opened, the image data of the constituents are subjected to the preliminary coding process including the quantization process at a fixed quantization width by the respective encoders, and the numbers of generated bits on the basis of the coded data output by the respective encoders are stored in the storage means 709. Then, in the main coding, the switches 714, 715 and 716 are closed, and the control signals 728, 729 and 730 according to the number-of-generated-bits information for the respective objects, which are stored in the storage means 709 are supplied to the respective encoders by the rate controller 710. Therefore, the number of bits can be kinetically allocated to the respective constituents so that the sum of the numbers of bits allocated to all the constituents does not exceed the capacity of the buffer at the decoding end. Besides, the numbers of bits generated in the coding processes for the respective constituents can be kinetically distributed among frames. Accordingly, part of the number of bits for a frame in which the image of a specific constituent is simple can be allocated to a frame in which the image of a specific constituent is complex. Thereby, the quality of the whole image can be further improved.

Embodiment 3

Figure 9:
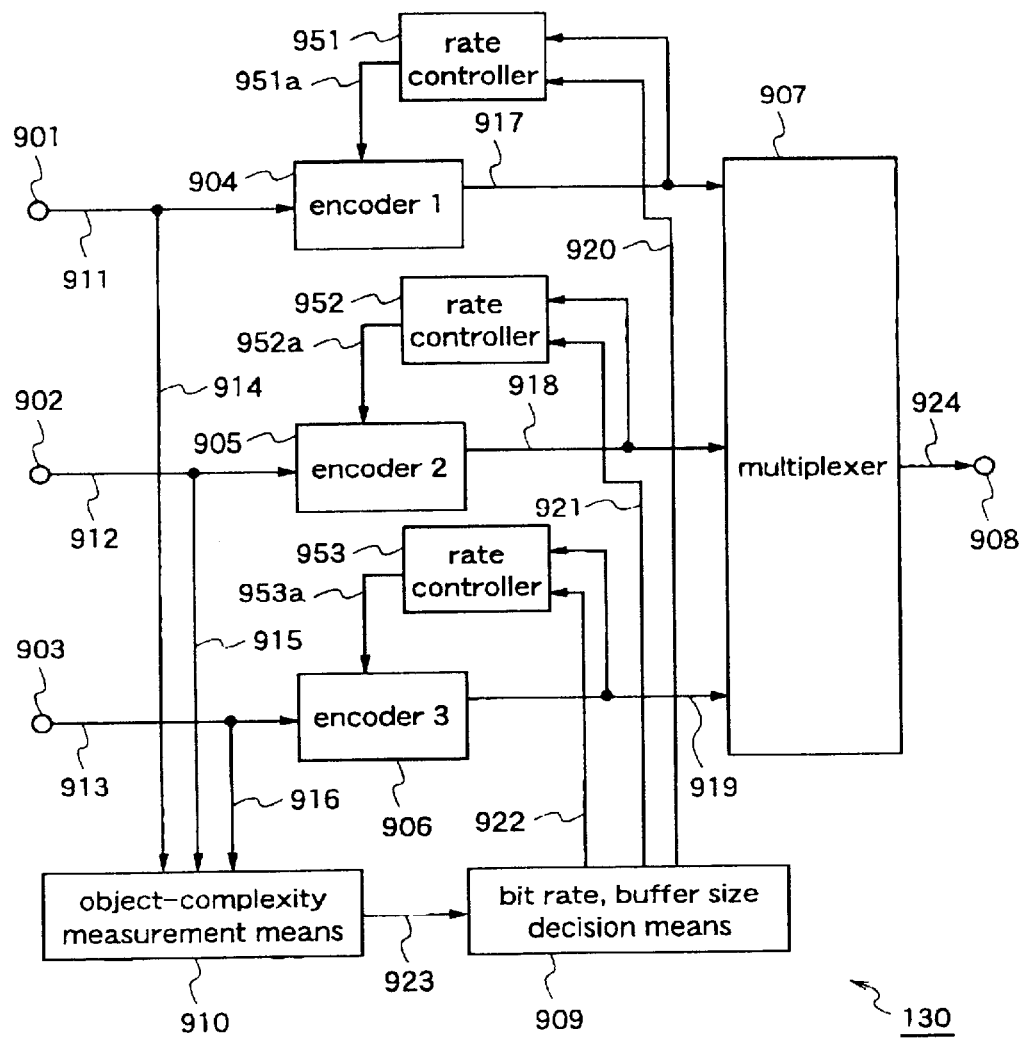
FIG. 9 is a block diagram illustrating an image coding apparatus (image processing apparatus) according to a third embodiment.

FIG. 9 is a block diagram illustrating an image coding apparatus according to a third embodiment of the present invention.

This third embodiment corresponds to claims 13 and 17–24.

When the image data for the respective constituents are coded, an image coding apparatus 130 of the third embodiment measures the complexities of the images of the respective constituents and decides the bit rates and buffer sizes for the respective constituents according to the complexities of the images. This image coding apparatus 130 is different in this point from the image coding apparatus of the first or second embodiment, which distributes the number of bits allocated to a frame among the respective constituents according to the complexities of the images of the respective constituents.

To be specific, the coding apparatus 130 includes a first encoder 904 for coding image data 911 for a first object (constituent) in accordance with a rate control signal 951a and outputting first coded data 917, a second encoder 905 for coding image data 912 for a second object (constituent) in accordance with a rate control signal 952a and outputting second coded data 918, a third encoder 906 for coding image data 913 for a third object (constituent) in accordance with a rate control signal 953a and outputting third coded data 919, and a multiplexer 907 for multiplexing the respective coded data 917, 918 and 919 and outputting a multiplex bitstream 924. Here, the respective encoders 904, 905 and 906 have the same structures as that of the first encoder 204 in the image coding apparatus 110a of the first embodiment as shown in FIG. 15.

The image coding apparatus 130 further includes an object-complexity measurement means 910 for measuring the numbers of pixels of the respective constituents (sizes of the constituents) as the indexes indicating the complexities of the respective constituents, on the basis of the respective image data 911, 912 and 913, and a coding condition decision means (bit rate, buffer size decision means) 909 for deciding bit rates and buffer sizes for the respective constituents, on the basis of information 923 indicating the complexities of the respective constituents output by the object complexity measurement means 910, and outputting control information 920, 921 and 922 indicating the decided bit rates and buffer sizes for the respective constituents.

The image coding apparatus 130 further includes a rate controller 951 for controlling the amount of codes generated by the first encoder 904 per unit time (bit rate) on the basis of the control information 920 and the coded data 917, a rate controller 952 for controlling the amount of codes generated by the second encoder 905 per unit time (bit rate) on the basis of the control information 921 and the coded data 918, and a rate controller 953 for controlling the amount of codes generated by the third encoder 906 per unit time (bit rate) on the basis of the control information 922 and the coded data 919.

In FIG. 9, the image data 911, 912 and 913 for the respective constituents are input to input terminals 901, 902 and 903 denote, respectively. The multiplex bitstream 924 is output from an output terminal 908.

The image decoding apparatus for decoding the multiplex bitstream 924 output by the image coding apparatus 130 of the third embodiment has the same structure as that of the image decoding apparatus 110b of the first embodiment as shown in FIG. 3.

Next, the operation will be described.

Figure 10:
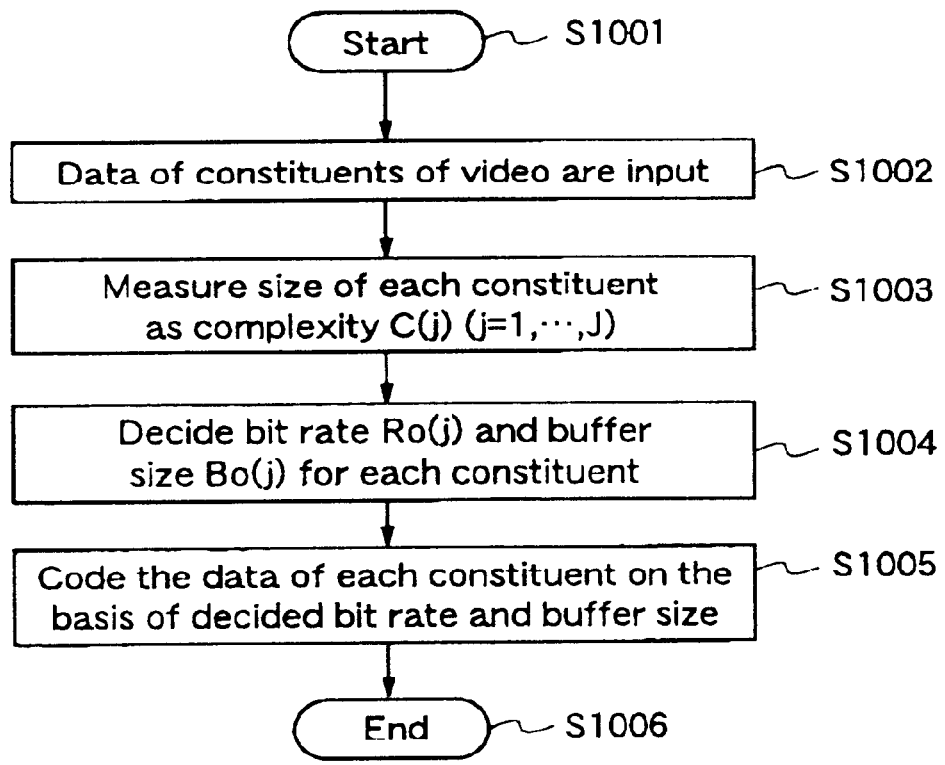
FIG. 10 is a flowchart showing a coding process according to an image coding method (image processing method) of the third embodiment.

FIG. 10 is a flowchart for showing the coding process by the image coding apparatus.

In this third embodiment, when the coding process is started (step S1001), image data for plural constituents (objects) of video (video image) are input (step S1002). In this third embodiment, the same video data as that in the first embodiment is used as a target of the coding process.

Next, in step S1003, the complexity of the image of each of the constituents C(j)(j=1, 2, . . . J) is measured. In this case, the size of each constituent, i.e., the number of pixels constituting the object to be displayed is used as the index of the complexity.

Then, the bit rate for each of the constituents is decided. At this time, the buffer size for each of the constituents is also decided. The bit rate Ro(j) of the target constituent is obtained by multiplying the total bit rate Rt according to the maximum transmission bit rate of the transmission path, by the ratio of the complexity C(j) of the target constituent to the sum C(j) of the complexities of all the constituents, as shown by a relationship (4).

$$Ro(j)=Rt \times C(j)/C(j) \quad (4)$$

Similarly, the buffer size Bo(j) of the target constituent is obtained by multiplying the maximum data storage capacity Bt of the buffer 304 in FIG. 3, by the ratio of the complexity C(j) of the target constituent to the sum C(j) of the complexities of all the constituents, as shown by a relationship (5).

$$Bo(j)=Bt \times C(j)/C(j) \quad (5)$$

The coding processes are performed for each of the constituents on the basis of the decided bit rate and buffer size (step S1005). When the coding process for the last frame is completed, the coding process is finished (step S1006).

In this case, the multiplex bitstream output by the image coding apparatus 130 of the third embodiment is decoded by an image decoding apparatus having the same structure as that of the image decoding apparatus 110b of the first embodiment as shown in FIG. 3.

As described above, in this third embodiment, the buffer sizes and bit rates for the respective constituents of the image of one scene are decided according to the complexities of the images of the respective constituents, and the image data for the respective constituents are coded on the basis of the decided buffer sizes and bit rates. Therefore, at the decoding end for the coded data of the respective constituents, the data storage area of a single buffer corresponding to a decoder can be kinetically allocated according to the complexities of the respective constituents. Accordingly, the data storage area of the single buffer corresponding to the decoder can be effectively utilized at the decoding end.

In addition, the bit rates are allocated according to the complexities of the images. Therefore, the respective constituents can be coded under the optimal conditions. Accordingly, the quality of a whole reproduced image of a video signal can be improved as well as the transmission rates of the coded data for the respective constituents can be adapted to the actual communication lines having restricted data transmission speeds.

In this third embodiment, as shown in step S1003 of FIG. 10, the sizes of the constituents, i.e., the numbers of pixels in the constituents are measured, and the bit rates and buffer sizes of the respective constituents are decided using the measured numbers of pixels as the indexes of the complexities of the images. However, the method of deciding the bit rate and buffer size is not limited to this.

Figure 11:
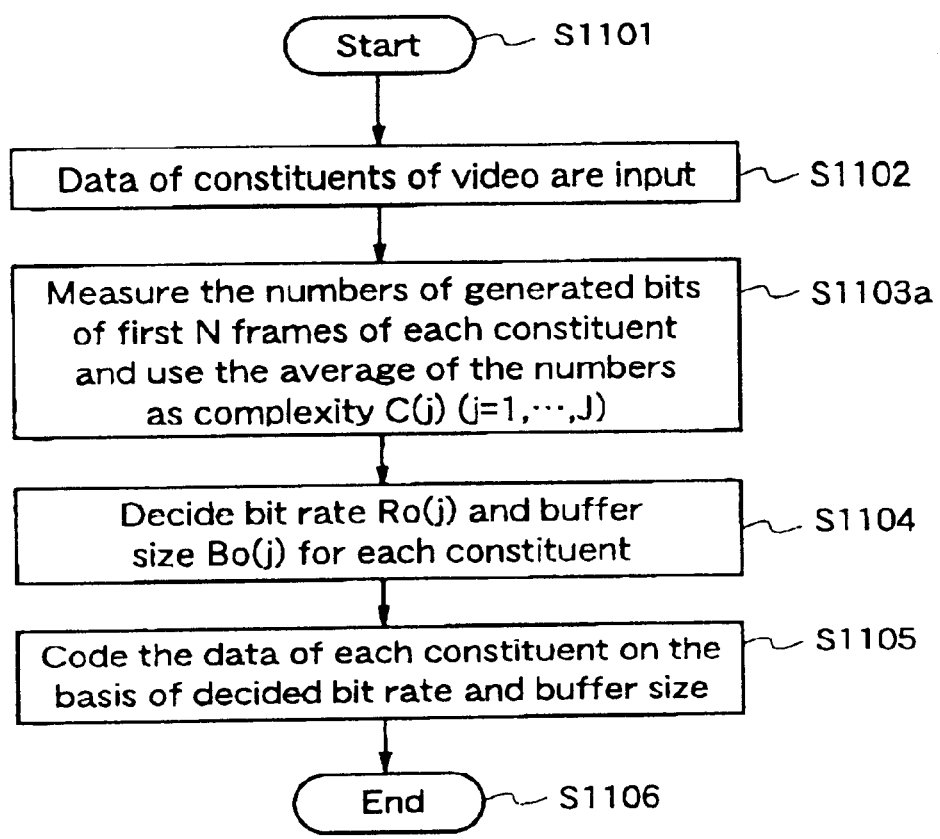
FIG. 11 is a flowchart showing a coding process of an image coding method (image processing method) according to a variation of the third embodiment.

For example, as shown in FIG. 11, after the coding process is started (step S1101) and data of constituents of video are input (step S1102), the numbers of bits generated by the coding processes for first N pieces of frames (for example, three frames) of each constituent are measured. Then, the average number of generated bits per frame for each constituent can be used as the index indicating the complexity C(j) (j=1, 2, . . . J) of the image of each constituent. In this case, the bit rate Ro(j) and buffer size Bo(j) for each constituent is decided on the basis of this index (step S1104). Then, the coding process is performed for each constituent on the basis of the decided bit rate and buffer size (step S1105) and then the coding process is finished (step S1106).

In the image coding apparatus 130 of the third embodiment, the complexities of the image of the respective constituents are measured when the data of the respective constituents of video are input. The bit rates and buffer sizes for the respective constituents are decided using the complexities of the images of the respective constituents as the indexes. Then, the image data of the respective constituents are coded on the basis of the decided bit rates and buffer sizes. However, the image coding apparatus can have a structure of measuring the complexities of the images of the respective constituents in a prescribed cycle, updating the bit rates and buffer sizes for each prescribed period, and coding the image data of the respective constituents on the basis of the updated bit rates and buffer sizes.

Figure 17:
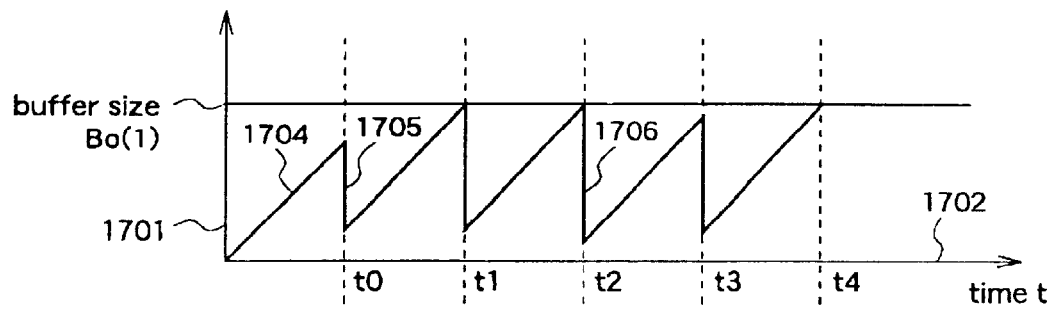
FIGS. 17(a)–17(c) are diagrams schematically showing a coding process of the image coding apparatus according to the variation of the third embodiment, FIGS. 17(a)–17(c) showing bit rates and buffer sizes Bo(1) Bo(2) and Bo(3) for the first, second and third constituents, respectively.
Figure 17:
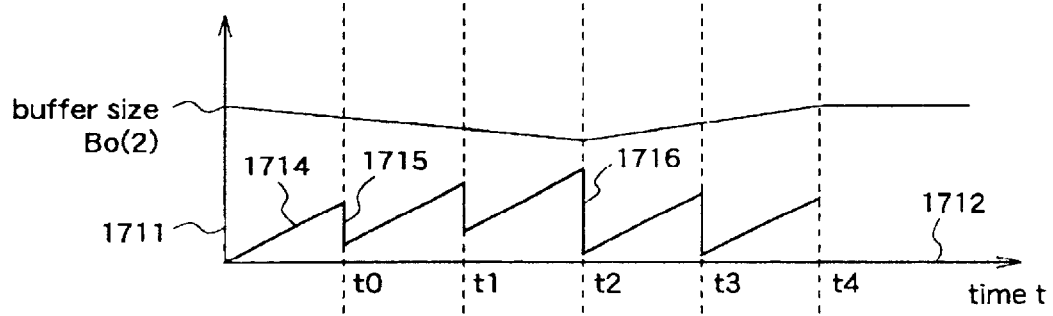
Figure 17:
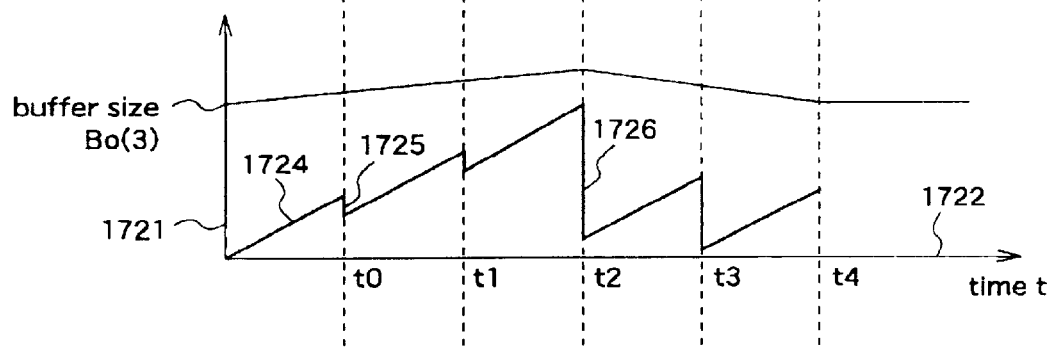

FIGS. 17(a)–17(c) are diagrams schematically showing the coding process according to the above-mentioned image coding apparatus. FIG. 17(a) shows the bit rate and buffer size Bo(1) for the first constituent. FIG. 17(b) shows the bit rate and buffer size Bo(2) for the second constituent. FIG. 17(c) shows the bit rate and buffer size Bo(3) for the third constituent.

In the figures, the vertical axes 1701, 1711 and 1721 show the occupied amounts of a buffer at the decoding end and the horizontal axes 1702, 1712 and 1722 show the display times t of compressed data (coded data). In this case, the display times t0, t1, t2, t3, . . . show times when n-th, (n+1)-th, (n+2)-th, (n+3)-th frames, . . . are displayed, for example. In addition, the inclination of an inclined part 1704 of a graph in FIG. 17(a) shows the bit rate for the first constituent. This bit rate is varied by the update for each prescribed period, although this is not shown in FIG. 17(a). Further, the length of a vertical line part 1705 which is vertical to the horizontal axis in the graph shows the number of bits of coded data of the first constituent corresponding to a frame which is displayed at time t0.

The inclinations of inclined parts 1714 and 1724 of graphs in FIGS. 17(b) and 17(c) show the bit rates for the second and third constituents. These bit rates are varied by the update for each prescribed period, although they are not shown in FIGS. 17(b) and 17(c). In addition, the lengths of vertical line parts 1715 and 1725 which are vertical to the horizontal axes of the graphs show the numbers of bits of coded data of the second and third constituents corresponding to frames which are displayed at time t0.

Here, the buffer size Bo(1) for the first constituent has a fixed value and the buffer sizes Bo(2) and Bo(3) for the second and third constituents are varied by the update for each prescribed period. The changes of these buffer sizes Bo(2) and Bo(3) are complementary. That is, when the former is increased, the latter is decreased, and when the former is decreased, the latter is increased.

In this case, the control of the buffer size for the third constituent, i.e., the control of increasing the buffer size with an increase in the bit rate is suitable for constituents in which the image quality takes priority over the restriction on the bit rate. In addition, the control of the buffer size for the second constituent, i.e., the control of changing the buffer size so as to absorb the changes in the buffer sizes of other constituents can be applied to constituents in which the restriction on the bit rate takes priority over the image quality.

Further, as the index of complexity in the third embodiment, in addition to the size of the constituent, the variance of each constituent (index which is obtained by the method (1) described in the first embodiment), the predicted error (index which is obtained by the method (2) described in the first embodiment), or information of the magnitude of motion (whether the image stands still or it is greatly moved) can be utilized. Further, as other indexes of complexity, the index which is obtained by the method (3) or (4) described in the first embodiment can be also utilized.

Further, when a coding or decoding program for implementing the structure of the coding or decoding apparatus according to any of the aforementioned embodiments is recorded in a storage medium such as a floppy disk, the processing according to any of the aforementioned embodiments can be easily implemented in an independent computer system.

Figure 12:
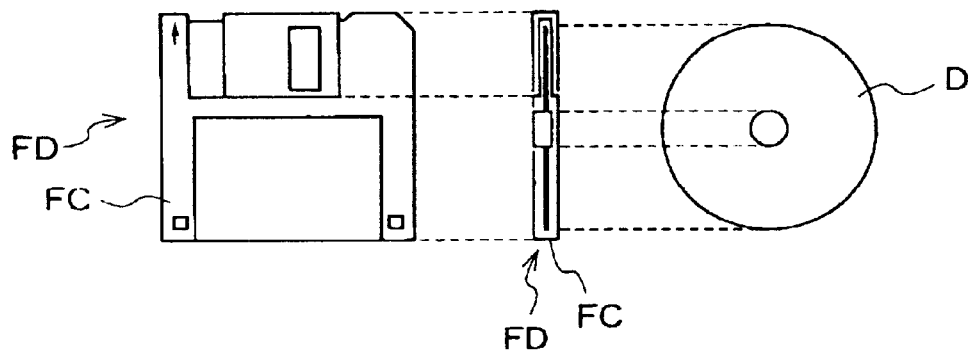
FIGS. 12(a) and 12(b) are diagrams illustrating a data storage medium which contains a program for implementing the image coding method according to any of the embodiments by a computer system.
FIG. 12(c) is a diagram illustrating the computer system.
Figure 12:
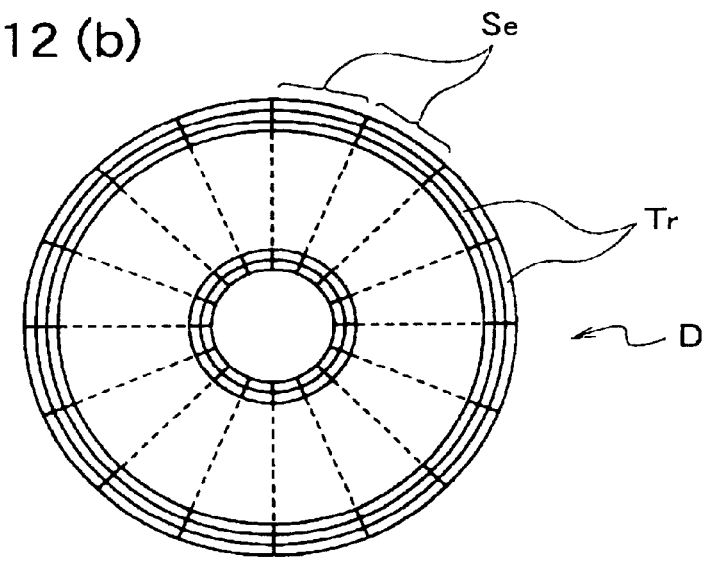
Figure 12:
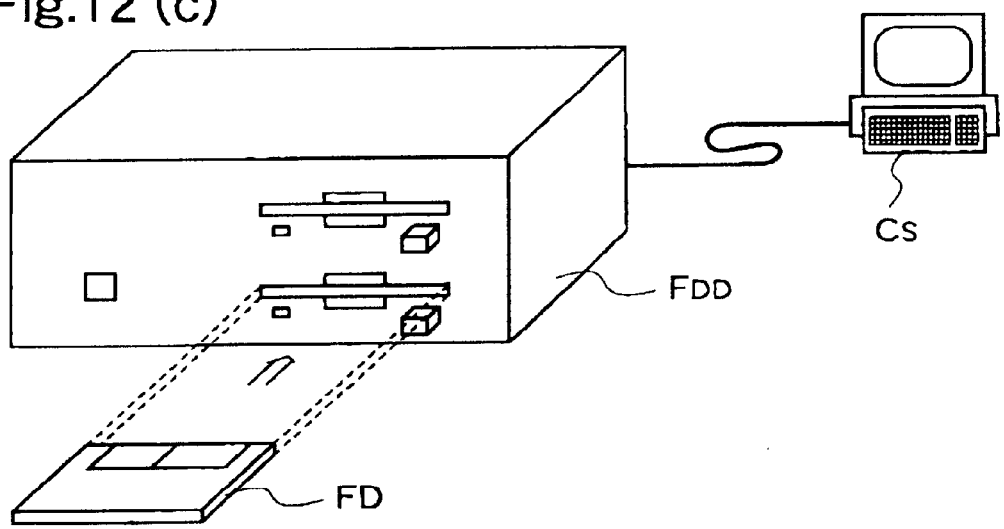
Figure 13:
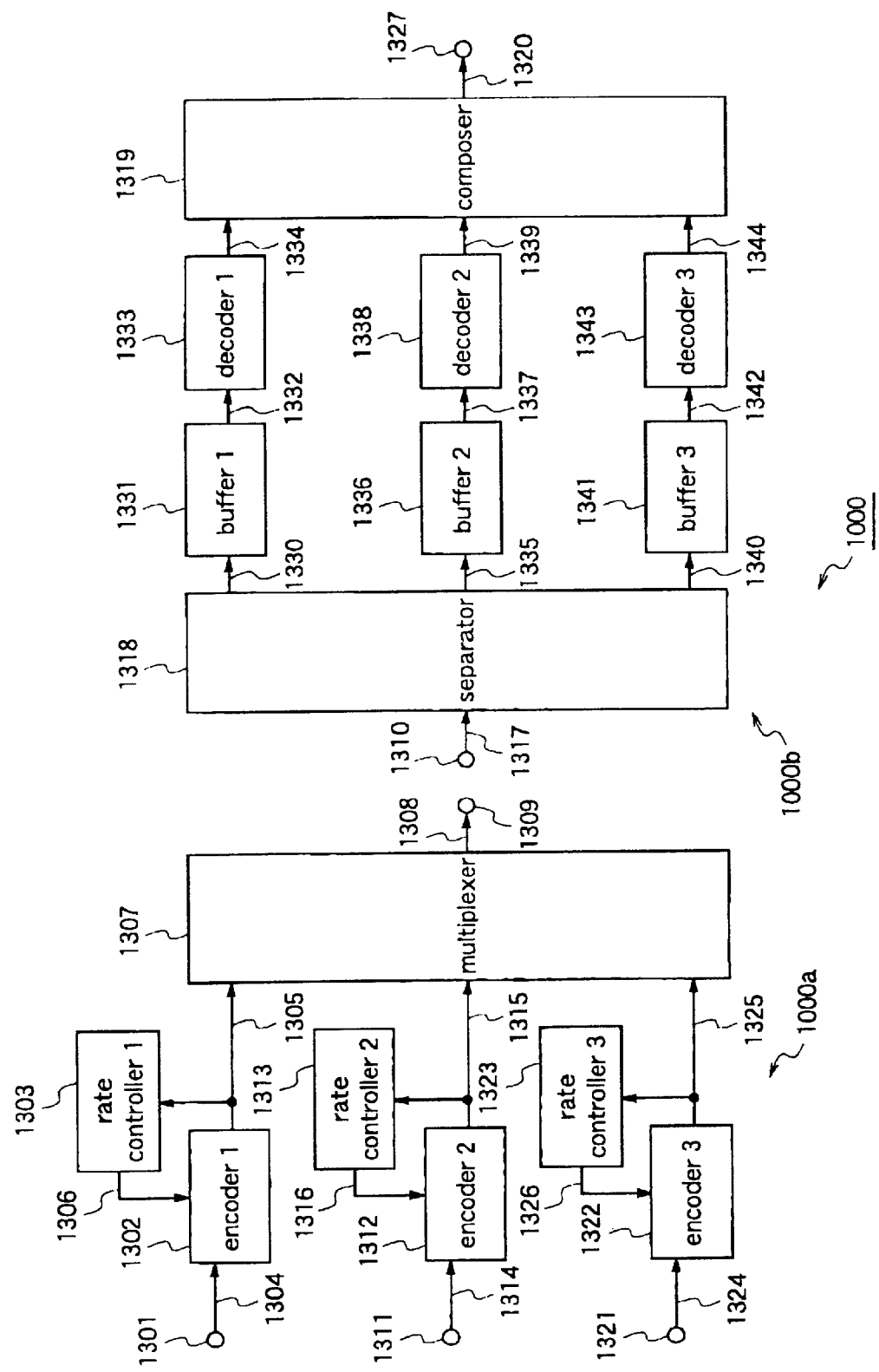
FIG. 13 is a block diagram illustrating a coding apparatus and decoding apparatus constituting a prior art image transmission system.
Figure 14:
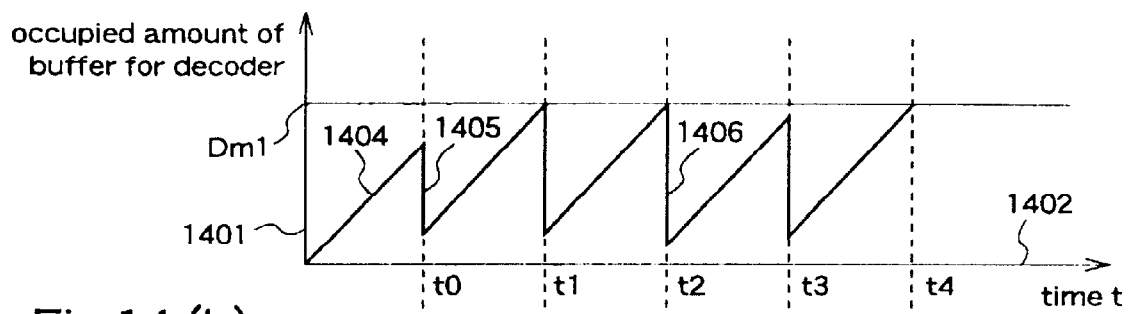
FIGS. 14(a)–14(c) are diagrams schematically showing transitions of amounts of occupation of buffers by coded data in the decoding apparatus of the prior art image transmission system, FIGS. 14(a)–14(c) corresponding to first, second and third constituents, respectively.
Figure 14:
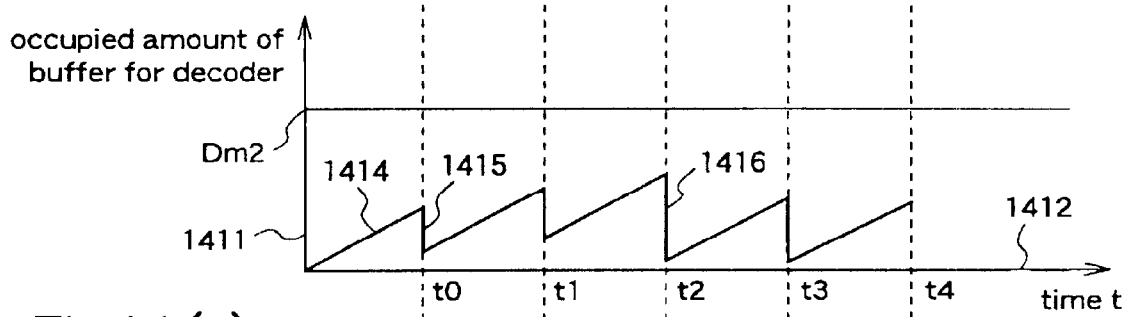
Figure 14:
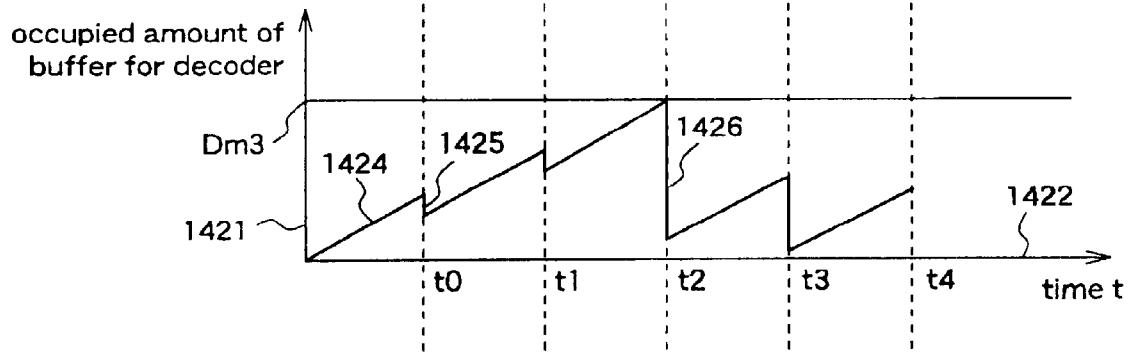

FIGS. 12(a)–12(c) are diagrams for explaining a case where the coding or decoding process according to any of the first to third embodiment is executed by a computer system using a floppy disk which contains the coding or decoding program.

FIG. 12(a) shows a front view of a floppy disk FD, a cross-sectional view thereof, and a floppy disk body D. FIG. 12(b) shows an example of a physical format of the floppy disk body D as a storage medium body. The floppy disk FD is composed of the floppy disk body D and a case F which contains the floppy disk body D. On the surface of the disk body, a plurality of tracks Tr are formed concentrically from the outer circumference of the disk toward the inner circumference. Each track is divided into 16 sectors (Se) in the angular direction. Therefore, in the floppy disk FD containing the above-mentioned program, data of the program are recorded in the assigned sectors on the floppy disk body D.

FIG. 12(c) shows the structure for recording/reproducing the program in/from the floppy disk FD. When the program is recorded in the floppy disk FD, data of the program are written in the floppy disk FD from the computer system Cs through the floppy disk drive FDD. When the above-mentioned coding or decoding apparatus is constructed in the computer system by the program recorded in the floppy disk, the program is read from the floppy disk by the floppy disk drive and then transferred to the computer system.

Although in the above description a floppy disk is employed as a data storage medium, an optical disk may be employed. Further, the storage medium is not limited to these disks, and any medium may be employed as long as it can contain the program, for example, an IC card or a ROM cassette.

What is claimed is:

1. An image processing method of subjecting a video signal for displaying a prescribed image, to an object coding processing of coding object image data for plural constituents of the prescribed image separately for each constituent, to convert the object image data into object coded data, comprising:

a complexity measurement step of measuring complexity of each constituent, corresponding to a number of bits required for the coding processing for each of the object image data; and a number-of-bits-allocation-ratio decision step of deciding a ratio of a number of bits which are allocated to each of the object image data among the plural constituents, according to the complexity of each constituent, wherein each of the object image data is coded so that a number of bits for each of the object coded data meets the decided ratio of the number of bits allocated among the constituents.

2. An image processing method of decoding multiplex coded data obtained by multiplexing object coded data for constituents, which are obtained according to the image processing method of claim 1, comprising:

a separation step of separating the object coded data for each of the constituents from the multiplex coded data;

a storage step of storing the object coded data for each of the constituents in a buffer; and a decoding step of extracting the object coded data for each constituent from the buffer and decoding the extracted object coded data.

3. The image processing method of claim 1 wherein an index indicating the complexity of each of the constituents is one of a first value which indicates a variance of pixel values of pixels constituting each of the constituents, a second value which indicates a magnitude of a temporal change of a display image of each of the constituents, a third value which is obtained by weighting a number of bits generated in coding a corresponding constituent in a previously processed frame which was subjected to the coding processing before a target frame as a target of the coding processing, by a ratio of a coefficient indicating characteristics of the constituent between the target frame and the previously processed frame, and a fourth value which indicates a number of generated bits for each of the constituent, which are generated in preliminarily coding the object image data for each of the constituents under prescribed coding conditions.

4. An image processing method of subjecting a video signal for displaying a prescribed image, to an object coding processing of coding object image data for plural constituents of the prescribed image separately for each constituent, to convert the object image data into object coded data, frame by frame as a unit of a display process, comprising:

a number-of-bits-per-frame decision step of deciding a number of bits per frame, which are allocated to a video signal corresponding to a target frame as a target of the coding processing; and a number-of-bits distribution step of distributing the number of bits per frame so as to correspond to each of constituents of the target frame, according to complexity of each of the constituents, to decide a number of bits per object for each of the constituents corresponding to the target frame, wherein each of the object image data corresponding to the target frame is coded so that a number of bits of corresponding object coded data is equal to the number of bits per object of each of the constituents corresponding to the target frame.

5. An image processing method of subjecting a video signal for displaying a prescribed image, to an object coding processing of coding object image data for plural constituents of the prescribed image separately for each constituent, to convert the object image data into object coded data, frame by frame as a unit of a display process, comprising:

a number-of-bits-per-frame decision step of deciding a number of bits per frame, which are allocated to a video signal corresponding to a target frame as a target of the coding processing; and a number-of-bits-allocation-ratio decision step of deciding a ratio of a number of bits which are allocated to each of the object image data among plural constituents of the target frame, according to a ratio of complexity of each of the constituents to a sum of complexities of the plural constituents, wherein each of the object image data is coded so that the number of bits per frame is distributed to each of the object coded data according to the decided ratio of the number of bits which are allocated among the plural constituents.

6. An image processing apparatus which subjects a video signal for displaying a prescribed image, to an object coding processing of coding object image data for plural constituents of the prescribed image separately for each constituent, to convert the object image data into object coded data, comprising:

a complexity measurement unit for measuring complexity of each of the constituents, which corresponds to a number of bits required for the coding processing for each of the object image data;

a number-of-bits allocation unit for allocating a number of bits which are used in coding object image data, to each of constituents of a target frame as a target of the coding processing, according to the complexity of each of the constituents;

an encoder for coding each of object image data corresponding to the target frame, on the basis of the number of bits allocated to each of the constituents, to generate the object coded data; and a multiplexer for multiplexing the object coded data for the constituents, to generate a bitstream.

7. The image processing apparatus of claim 6 wherein the number-of-bits allocation unit allocates the number of bits to each of the constituents on the basis of a ratio of the complexity of each of the constituents to a sum of the complexities of all the constituents of the target frame.

8. The image processing apparatus of claim 6 wherein the complexity measurement unit measures the complexity of each of the constituents using as an index, one of a first value which indicates a variance of pixel values of pixels constituting each of the constituents, a second value which indicates a magnitude of a temporal change of a display image of each of the constituents, a third value which is obtained by weighting a number of bits generated in coding a corresponding constituent in a previously coded frame which was subjected to the coding processing before the target frame, by a ratio of a coefficient indicating characteristics of the constituent between the target frame and the previously processed frame, and a fourth value which indicates a number of generated bits for each of the constituent, which are generated in preliminarily coding the object image data for each of the constituents under prescribed coding conditions.

9. The image processing apparatus of claim 6 wherein the number-of-bits allocation unit distributes a number of bits per frame, which are allocated to a video signal of the target frame, to each of the constituents, so that a buffer for containing the object coded data corresponding to each of the constituents, which data is separated from the bitstream in an image decoding apparatus which subjects the bitstream to a decoding processing does not overflow or underflow.

10. A data storage medium which contains an image processing program wherein the image processing program is a program for executing the coding processing for video signals according to the image processing method of claim 1, by a computer.

11. An image processing method which includes a data processing at transmission end for converting a video signal for displaying a prescribed image into a bitstream, frame by frame, according to a coding processing, and transmitting the bitstream, and a data processing at receiving end for receiving the bitstream, and converting the bitstream into reproduced data, frame by frame, according to a decoding processing, wherein the data processing at transmission end comprises;

an object coding step of coding object image data of a target frame as a target of the coding processing, corresponding to plural constituents of the prescribed image separately for each constituent, to convert the object image data into object coded data; and a multiplexing step of multiplexing the object coded data corresponding to the constituents, to generate the bitstream, and the data processing at receiving end comprises steps of:

a data storage step of storing the bitstream in one buffer, frame by frame;

a decoding step of reading a bitstream corresponding to the target frame from the buffer and decoding the read bitstream separately for each constituent, to generate reproduced data corresponding to each of the constituents; and a composition and display step of composing the reproduced data corresponding to the constituents Lo generate composed data, and displaying the prescribed image on the basis of the composed data.

12. The image processing method of claim 11 wherein the object coding step comprises:
   a number-of-bits decision step of deciding a number of bits per frame, which are allocated to the target frame as a target of the coding, so that the buffer does not underflow or overflow; and
   a number-of-bits distribution step of distributing the number of bit per frame so as to correspond to each of constituents of the target frame according to complexity of each of the constituents, to decide a number of bits per object for each of the constituents, and
   the object image data for each of the constituents of the target frame is coded on the basis of each of the number of bits per object.

13. An image processing apparatus which decodes multiplex coded data which is obtained by subjecting a video signal for displaying a prescribed image to an object coding processing of coding object image data for plural constituents of the prescribed image separately for each constituent to convert the object image data into object coded data, and multiplexing the object coded data, comprising:
   a separator for separating the object coded data corresponding to each of the constituents from the multiplex coded data;
   a buffer for containing the object coded data corresponding to each of the constituents; and
   a decoder for extracting the object coded data corresponding to each of the constituents from the buffer and decoding the object coded data.

14. An image processing method for subjecting a video signal for displaying a prescribed image, to an object coding processing of coding object image data for plural constituents of the prescribed image separately for each constituent, to convert the object image data into object coded data, frame by frame as a unit of a display process, comprising:
   a complexity obtaining step of obtaining a number of generated bits for each of the constituents, which bits are obtained by preliminarily coding the object image data corresponding to each of the constituents, as an index of complexity of each of the constituents;
   a distribution-ratio-per-frame obtaining step of obtaining a ratio of the complexity of a target frame as a target of a main coding processing, to a sum of the complexities of all frames which are not subjected to the main coding processing yet, as a distribution ratio per frame;
   a number-of-bits-per-frame decision step of multiplying a number of bits which are not used yet among a total number of bits which are allocated to the video signal, by the distribution ratio per frame, to decide a number of bits which are allocated to the target frame;
   a distribution ratio obtaining step of obtaining a ratio of complexity of each of constituents of the target frame as a target constituent of the main coding processing to a sum of complexities of all the constituents, as a distribution ratio per constituent;
   a number-of-bits-per-constituent decision step of multiplying the number of bits which are allocated to the target frame, by the distribution ratio per constituent, to decide a number of bits which are allocated to the target constituent; and
   a constituent coding step of coding the object image data corresponding to each of the constituents of the target frame separately on the basis of the number of bits allocated to each of the constituents.

15. An image processing apparatus which subjects a video signal for displaying a prescribed image, to an object image processing of coding object image data for plural constituents of the prescribed image separately for each constituent, to convert the object image data into object coded data, comprising:
   a complexity measurement unit for obtaining a number of generated bits for each of the constituents, which bits are generated by preliminary coding the object image data corresponding to each of the constituents, as an index of complexity of each of the constituents;
   a distribution-ratio-per-frame obtaining unit for obtaining a ratio of the complexity of a target frame as a target of a main coding processing, to a sum of the complexities of all frames which are not subjected to the main coding processing yet, as a distribution ratio per frame;
   a number-of-bits-per-frame decision unit for multiplying a number of bits which are not used yet among a total number of bits which are allocated to the video signal, by the distribution ratio per frame, to decide the number of bits which are allocated to the target frame;
   a distribution ratio obtaining unit for obtaining a ratio of complexity of each of constituents of the target frame as a target constituent of the main coding processing to a sum of complexities of all the constituents, as a distribution ratio per constituent;
   a number-of-bits-per-constituent decision unit for multiplying the number of bits which are allocated to the target frame, by the distribution ratio per constituent, to decide a number of bits which are allocated to the target constituent;
   a coding unit for coding each of the constituents of the target frame separately on the basis of the number of bits allocated to each of the constituents, to generate the object coded data; and
   a multiplexer for multiplexing the object coded data corresponding to the plural constituents, and outputting a bitstream.

16. A data storage medium which contains an image processing program wherein
   the image processing program is a program for executing the coding processing of video signals according to the image processing method of claim 14, by a computer.

17. An image processing method of subjecting a video signal for displaying a prescribed image, to an object coding processing of coding object image data for plural constituents of the prescribed image separately for each constituent, to convert the object image data into object coded data, wherein
   the object coding processing comprises:
      a complexity measurement step of measuring complexity of each of the constituents, which corresponds to a number of bits required for the coding processing for each of the object image data; and
      a rate ratio decision step of deciding a ratio of a bit rate of the object coded data for each of the constituents among the plural constituents, according to the complexity of each of the constituents, and
      the object image data for each of the constituents is coded at a prescribed bit rate on the basis of the ratio of the bit rate for each of the constituents, so that a sum of the bit rates for all the constituents has a fixed value.

18. An image processing method of decoding multiplex coded data obtained by multiplexing the object coded data for the constituents, which are obtained according to the image processing method of claim 17 comprising:

a separation step of separating the object coded data for each of the constituents from the multiplex coded data;

a storage step of storing the object coded data for each of the constituents in one buffer; and a decoding step of extracting the object coded data for each of the constituents from the buffer, and decoding the object coded data.

19. The image processing method of claim 17 wherein the object coding processing comprises:

a coding condition decision step of deciding a ratio of a bit rate for each of the constituents and a maximum amount of the object coded data stored in the buffer, corresponding to each of the constituents, according to the complexity of each of the constituents, so that the buffer does not underflow or overflow, and the object image data for each of the constituents is coded at a prescribed bit rate on the basis of the ratio of the bit rate for each of the constituents, so that a sum of the bit rates for all the constituents has a fixed value.

20. The image processing method of claim 17 wherein an index indicating the complexity of each of the constituents is one of a first value which indicates a variance of pixel values of pixels constituting each of the constituents, a second value which indicates a magnitude of a temporal change of a display image of each of the constituents, a third value which is obtained by weighting a number of bits generated in coding a corresponding constituent in a previously processed frame which was subjected to the coding processing before a target frame as a target of the coding processing, by a ratio of a coefficient indicating characteristics of the constituent between the target frame and the previously processed frame, and a fourth value which indicates a number of generated bits for each of the constituents, which are generated in preliminarily coding the object image data for each of the constituents under prescribed coding conditions.

21. An image processing method of subjecting a video signal for displaying a prescribed image, to an object coding processing of coding object image data for plural constituents of the prescribed image separately for each constituent, to convert the object image data into object coded data, wherein the object coding processing comprises:

a complexity measurement step of measuring complexity of each of the constituents, which corresponds to a number of bits required for the coding processing of each of the object image data; and a coding condition decision step of deciding a ratio of a bit rate of the object coded data for each of the constituents among the plural constituents, and a maximum amount of the object coded data stored in the buffer at a decoding end, corresponding to each of the constituents, according to a ratio of the complexity of each of the constituents to a sum of the complexities of all the constituents, and the object image data for each of the constituents is coded at a prescribed bit rate on the basis of the ratio of the bit rate for each of the constituent, so that a sum of the bit rates for all the constituents has a fixed value.

22. An image processing apparatus which subjects a vide signal for displaying a prescribed image, to an object coding processing of coding object image data for plural constituents of the prescribed image separately for each constituent, to convert the object image data into object coded data, comprising:

a complexity measurement unit for measuring complexity of each of the constituents, which corresponds to a number of bits required for the coding processing for each of the object image data;

a coding condition decision unit for deciding an individual bit rate for each of the constituents and an individual buffer size for each of the constituents as a maximum amount of the object coded data stored in a buffer at a decoding end, according to the complexity of each of the constituents;

a controller for outputting a control signal on the basis of the decided individual bit rate and individual buffer size;

an encoder for performing the coding processing for the object image data for each of the constituent, with controlling a number of bits generated by the coding processing on the basis of the control signal, and outputting the objet coded data for each of the constituents; and a multiplexer for multiplexing the object coded data for the constituents, to generate a bitstream.

23. The image processing apparatus of claim 22 wherein the coding condition decision unit distributes a maximum transmission bit rate of a transmission path to each of the constituents according to the complexity of each of the constituents, to decide the individual bit rate for each of the constituents, and distributes a maximum data storage amount of the buffer at the decoding end to each of the constituents according to the complexity of each of the constituents, to decide the individual buffer size.

24. A data storage medium which contains an image processing program wherein the image processing program is a program for executing the coding processing for video signals according to the image processing method of claim 17, by a computer.

* * * * *

UNITED STATES PATENT AND TRADEMARK OFFICE
CERTIFICATE OF CORRECTION

PATENT NO. : 6,574,368 B1
DATED : June 3, 2003
INVENTOR(S) : Choong Seng Boon et al.

It is certified that error appears in the above-identified patent and that said Letters Patent is hereby corrected as shown below:

Title page,
Item [57], ABSTRACT,
Line 9, change "and an a" to -- and a --.

Column 32,
Line 66, change "Lo" to -- to --.

Column 36,
Line 24, change "objet" to -- object --.

Signed and Sealed this

Thirtieth Day of December, 2003

JAMES E. ROGAN
*Director of the United States Patent and Trademark Office*